(12) United States Patent
Correa et al.

(10) Patent No.: US 7,958,843 B2
(45) Date of Patent: Jun. 14, 2011

(54) IN-OVO INJECTION MACHINE WITH TRANSVERSELY MOVABLE EGG TRAY ASSEMBLY FOR MANUAL EGG TRANSFER AFTER INJECTION

(75) Inventors: Rafael S. Correa, Salisbury, MD (US); William D. Samson, Salisbury, MD (US); Erich Frederik Bevensee, Eden, MD (US)

(73) Assignee: Avitech, LLC, Salisbury, MD (US)

( * ) Notice: Subject to any disclaimer, the term of this patent is extended or adjusted under 35 U.S.C. 154(b) by 343 days.

(21) Appl. No.: 12/222,307

(22) Filed: Aug. 6, 2008

(65) Prior Publication Data

US 2009/0183685 A1 Jul. 23, 2009

Related U.S. Application Data

(60) Provisional application No. 61/006,610, filed on Jan. 23, 2008.

(51) Int. Cl.
  *A01K 43/00* (2006.01)
(52) U.S. Cl. ........................................................ 119/6.8
(58) Field of Classification Search ................... 119/6.8, 119/348, 346, 341, 342
See application file for complete search history.

(56) References Cited

U.S. PATENT DOCUMENTS

| | | | |
|---|---|---|---|
| 1,191,061 A | 7/1916 | Carter | |
| 3,377,989 A | 4/1968 | Sandhage et al. | |
| 4,040,388 A | 8/1977 | Miller | |
| 4,469,047 A * | 9/1984 | Miller | 119/6.8 |
| 4,593,646 A * | 6/1986 | Miller et al. | 119/6.8 |
| 4,681,063 A | 7/1987 | Hebrank | |
| 4,903,635 A | 2/1990 | Hebrank | |
| 5,056,464 A | 10/1991 | Lewis | |
| 5,107,794 A | 4/1992 | Bounds, Jr. | |
| 5,136,979 A | 8/1992 | Paul et al. | |
| 5,247,903 A | 9/1993 | Bounds, Jr. | |
| RE35,973 E | 12/1998 | Paul et al. | |
| 5,900,929 A | 5/1999 | Hebrank et al. | |
| 5,941,696 A | 8/1999 | Fenstermacher et al. | |
| 6,032,612 A | 3/2000 | Williams | |

(Continued)

FOREIGN PATENT DOCUMENTS

GB 2 297 677 8/1996

OTHER PUBLICATIONS

INOVOJECT brochure, Embrex, Inc. (Undated).

(Continued)

*Primary Examiner* — Yvonne R. Abbott
(74) *Attorney, Agent, or Firm* — Jacobson Holman PLLC

(57) ABSTRACT

An in-ovo egg injection machine has a transversely or laterally movable supporting structure which is mounted beneath and adjacent the injector assembly and enables the operator to move egg trays into and out of the injection area from the side of the machine. The supporting structure includes two longitudinally extending opposed support rails that are mounted on a movable member so that the longitudinal support rails are spaced from one another at a set distance to define a support cradle. The movable member is supported on two transversely extending guide rails that are approximately twice the width of the injection area in length so as to allow the support cradle to be moved, preferably by hand, to an injection position directly under the injector assembly and then, by moving the support cradle in a lateral direction on the guide rails, to a loading/unloading position horizontally spaced from the injection area.

24 Claims, 23 Drawing Sheets

U.S. PATENT DOCUMENTS

| | | |
|---|---|---|
| 6,149,375 A | 11/2000 | Hebrank |
| 6,240,877 B1 | 6/2001 | Bounds |
| 6,244,214 B1 | 6/2001 | Hebrank |
| 6,286,455 B1 * | 9/2001 | Williams ................ 119/6.8 |
| 6,499,428 B1 | 12/2002 | Prindle |
| 6,601,533 B1 | 8/2003 | Bounds |
| 6,601,534 B2 | 8/2003 | Hebrank |
| 6,629,962 B2 | 10/2003 | Correa et al. |
| 6,668,753 B2 | 12/2003 | Hebrank |
| 7,041,439 B2 | 5/2006 | Phelps et al. |
| 7,096,820 B2 | 8/2006 | Correa et al. |
| 7,185,603 B2 | 3/2007 | Correa et al. |
| 7,430,987 B2 * | 10/2008 | Smith ..................... 119/6.8 |
| 7,721,674 B2 * | 5/2010 | Smith ..................... 119/6.8 |
| 2003/0056729 A1 | 3/2003 | Correa et al. |
| 2004/0144324 A1 * | 7/2004 | Gross et al. ............. 119/6.8 |
| 2004/0163602 A1 * | 8/2004 | Correa et al. ........... 119/6.8 |
| 2005/0039688 A1 * | 2/2005 | Correa et al. ........... 119/6.8 |
| 2007/0144443 A1 | 6/2007 | Correa et al. |

OTHER PUBLICATIONS

SERVOJECT brochure, Automatic Egg Injection System (undated).

* cited by examiner

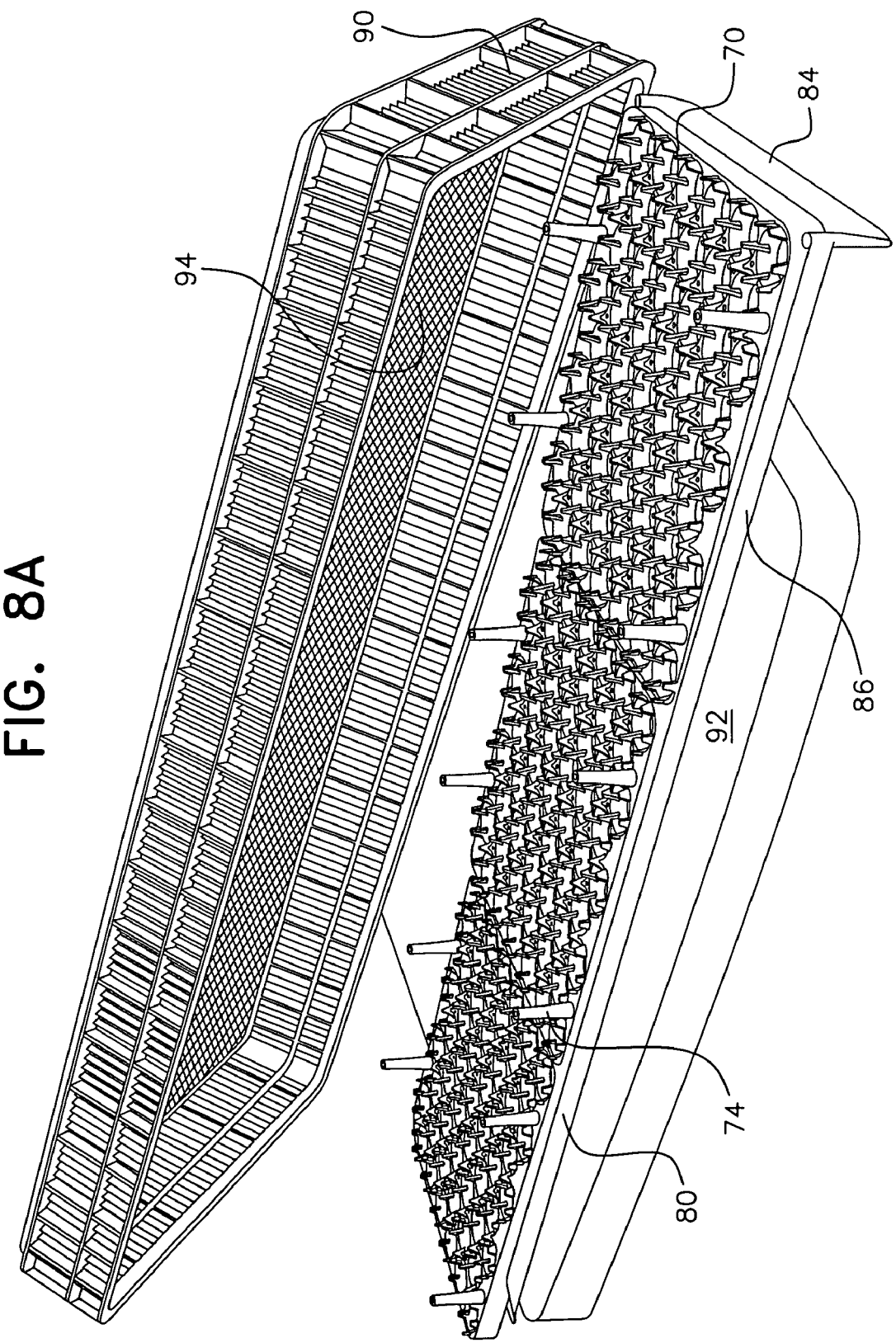

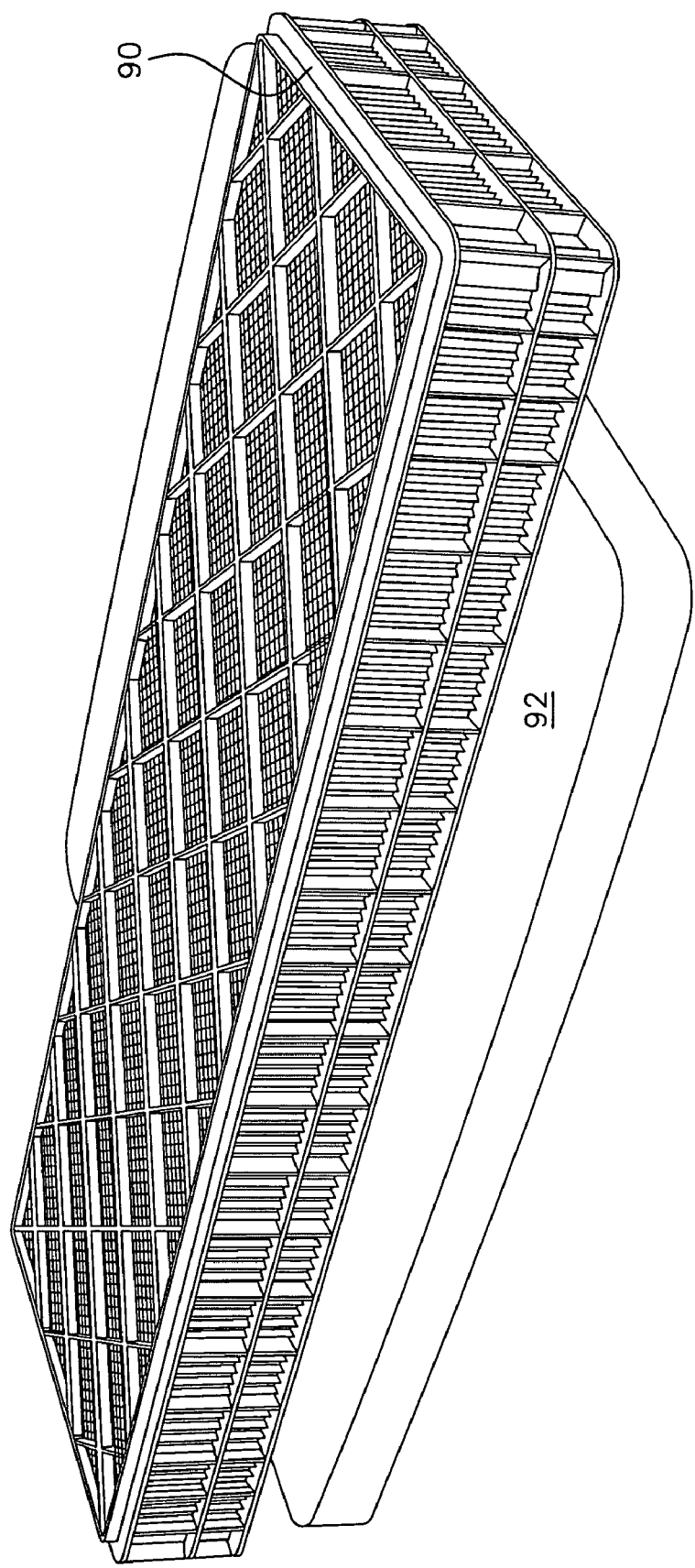

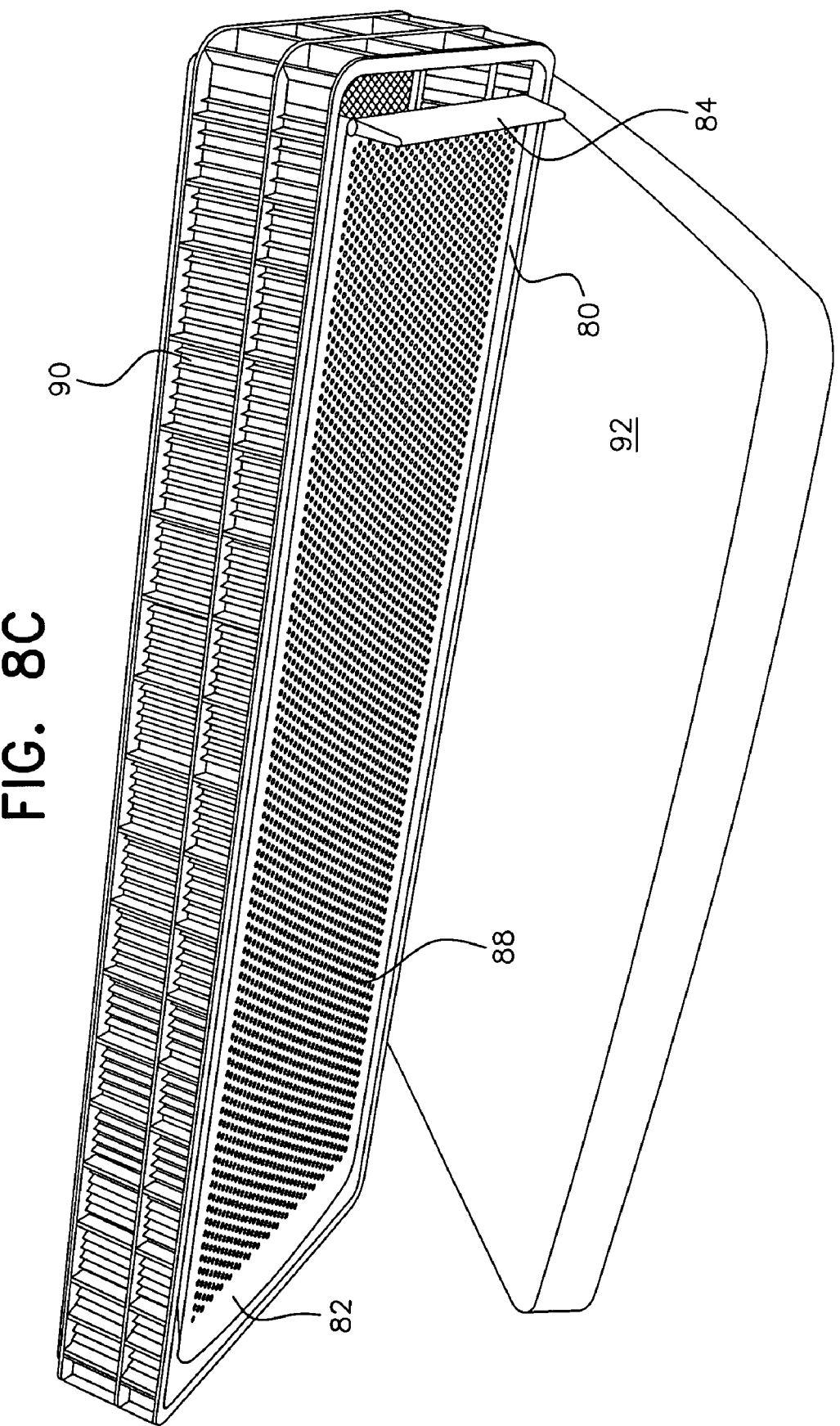

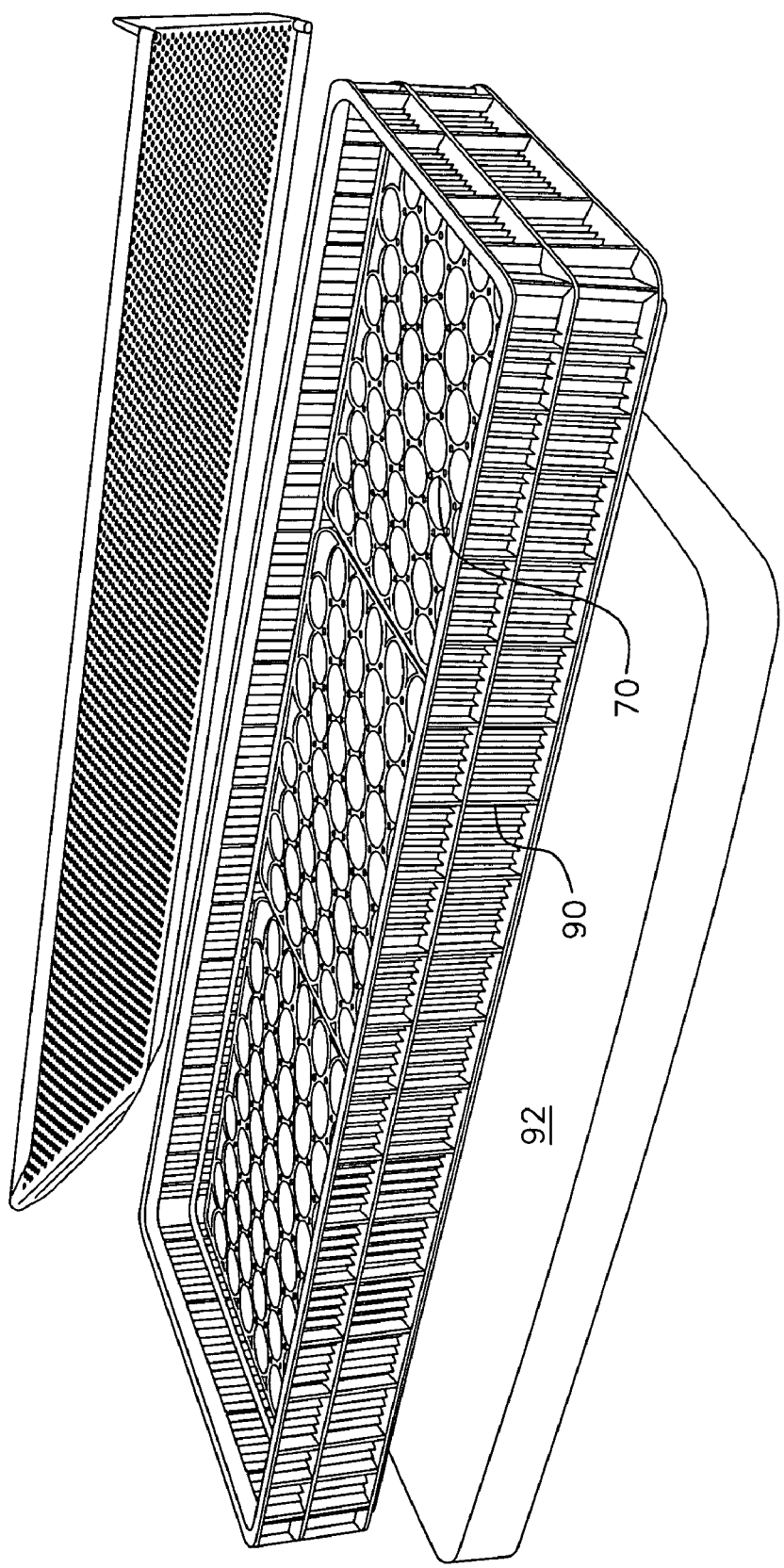

IN-OVO INJECTION MACHINE WITH TRANSVERSELY MOVABLE EGG TRAY ASSEMBLY FOR MANUAL EGG TRANSFER AFTER INJECTION

This application is entitled to and hereby claims the priority of co-pending U.S. provisional application, Ser. No. 61/006,610 filed Jan. 23, 2008.

BACKGROUND OF THE INVENTION

1. Field of the Invention

The present invention is related to the field of in-ovo egg vaccination and, more particularly, to a compact in-ovo egg injection machine with a transversely movable rail system for placement of incubated eggs into the machine for injection and removal from the machine after injection.

2. Description of the Related Art

In-ovo egg injection machines are known in the art and are used effectively to inject a plurality of eggs with vaccine or other substance as desired. The INTELLIJECT® in-ovo egg injection machine is manufactured by the present assignee and its basic structure and operation are described in detail in U.S. Pat. No. 7,096,820 ("the '820 patent"). The '820 patent is hereby expressly incorporated by reference in its entirety as if fully set forth herein.

By reference to the '820 patent, the INTELLIJECT® in-ovo egg injection machine 100 includes a longitudinal track 150 by which eggs in conventional incubation trays 168 are moved from an injection section, generally designated by the reference numeral 130, at the front of the machine to an egg transfer section, generally designated by the reference numeral 132, at the back of the machine.

In the injection section 130, an injection assembly 131 includes a plurality of injectors 204, arranged in a pattern corresponding to that of the eggs in the egg tray 168, which are lowered into contact with the eggs. The eggs are then injected with a vaccine or other desired substance, after which the injector assembly 131 and injectors 204 are raised, and the egg tray 168 is moved rearwardly along the track 150 to the egg transfer section 132 by pusher assembly 280. A complete description of the automated steps by which the egg tray 168 is moved longitudinally through the in-ovo egg injection machine 100 using the pusher assembly is set forth in the '820 patent. The egg injection and egg transfer sections are also fully described in the '820 patent and therefore will not be discussed further herein as pertaining to their basic operation.

Another solution is the INOVOJECT® machine marketed by Embrex Corporation which uses two needles, one inside the other, such as shown in U.S. Pat. No. 4,903,635. The larger needle or punch penetrates the egg shell by using force, and the inside needle is then pneumatically pushed into the embryonic cavity at high speed. The eggs are injected and transferred by an automated transfer apparatus from the incubating trays to hatching trays.

The INTELLIJECT® and INOVOJECT® in-ovo egg injecting machines, as well as other such machines on the market, are relatively large machines and are best suited for the large volume hatcheries which can afford the high cost of such machines and have the available space for their operation. On the other hand, smaller hatcheries which have fewer eggs to inject also need an automated egg injection capability in order to provide for safe and effective vaccination of developing embryos at a reasonable cost. This is especially true for small hatcheries which process eggs with multiple type incubator trays, thus necessitating multiple machines, and/or which have small available machine space. Accordingly, a need exists for a smaller, less expensive in-ovo egg injection machine that can be procured by smaller volume operators at a lesser cost and which can be accommodated in a smaller floor space.

SUMMARY OF THE INVENTION

In view of the foregoing, one object of the present invention is to provide an in-ovo egg injection machine that is fairly compact in size and yet possesses highly accurate, automated egg injection capability.

Another object of the present invention is to provide an in-ovo egg injection machine that also brings state of the art automated vaccine dosage control and egg injection capability to smaller volume incubation operations.

Yet another object of the present invention is to provide a compact in-ovo egg injection machine in accordance with the preceding objects that automatically injects up to three egg trays of eggs simultaneously using a matrix of injectors in an injector assembly while having a footprint not much larger than the injector matrix.

A further object of the present invention is to provide an in-ovo egg injection machine in accordance with the preceding objects that has a transversely movable rail system which enables egg trays to be easily moved transversely into and out of the side of the injector assembly after the eggs have been injected.

A still further object of the present invention is to provide an in-ovo egg injection machine that can be manufactured at a lower cost while still providing highly accurate automated injection capability.

In accordance with these and other objects, the present invention is directed to an in-ovo egg injection machine having an injector assembly consisting of a plurality of injectors arranged in a generally rectangular matrix and coupled to a vaccine delivery system such as is illustrated and described in the '820 patent. For ease of description, the "front" and "back" of the present injection machine correspond with the front and back of the injection machine 100 set forth in the '820 patent, with the injector assembly extending longitudinally in an injection section between the front and back. The injector assembly of the present invention can be substantially identical in structure and operation to the injection assembly 131 of the machine 100 disclosed in the '820 patent. Therefore, the details will not be repeated here.

A transversely or laterally movable rail system is mounted beneath and adjacent the injector assembly. The rail system enables the operator to position egg trays into and out of the injection section under the injector assembly from the side of the machine. In this way, the machine, which is already compact in size so as to reduce the amount of space needed to accommodate it, can be positioned with the front or back thereof against a wall, if desired, to further reduce the space required.

The rail system includes a pair of longitudinally extending opposed support rails that are rigidly mounted on a movable plate-like member, so that the opposed support rails are spaced from one another at a set distance to define a traveling support cradle. The movable plate member is movably supported on two transversely extending guide rails. The guide rails have a length that is approximately twice the width of the injector assembly so that the support cradle can be moved between an injection position directly underneath the injector assembly in the injection section and, by moving the support cradle in a lateral or transverse direction on the guide rails, to a loading position in the injection section directly underneath the injector assembly. Preferably, the support cradle is moved between the injection position and the loading position by wheels mounted underneath the cradle which roll on the transverse guide rails.

To load the eggs for injection, the operator places at least one egg tray, and preferably three egg trays, onto a conventional flat egg tray pan used by the hatchery. The longitudinal edges of the pan are bent upwardly to create stops that secure the egg tray(s) and prevent them from laterally sliding off the pan, and the spacing between the opposed support rails on the support cradle is sized to engage and hold the pan therebetween. With the egg tray or trays on the pan and the support cradle in the loading position, the operator places the pan onto the support rails in the support cradle and positions the pan longitudinally so that the eggs are in general alignment with the corresponding set of the injectors. The operator then moves the support cradle into the injection position where the operator initiates the injection cycle and the eggs are injected. Following injection, the operator brings the support cradle back to the loading position where the pan with the egg tray(s) can be removed so that the injected eggs can be transferred to a hatching basket.

After the injection and while the traveling support cradle is in the loading and unloading position (transversely away from the injection position), the injectors go through a sanitizing cycle similar to that described in the '820 patent previously incorporated by reference. Preferably, a series of spray nozzles are mounted on the machine frame directly underneath the injectors, but spaced below the traveling support cradle so as not to interfere with its travel. The spray nozzles direct sanitizing solution upwardly onto the injection nozzles and injection needles during the sanitizing cycle, and spent solution drops onto a collection pan positioned on the frame underneath the spray nozzles, similar to that described in the '820 patent.

The advantages and capabilities of the foregoing in-ovo egg injection machine, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 8A-8E are photographs showing the steps for transferring the eggs trays of FIG. 6 (with the injected eggs not shown) from the pan to a hatching tray.

DETAILED DESCRIPTION OF THE PREFERRED EMBODIMENTS

Figure 1:
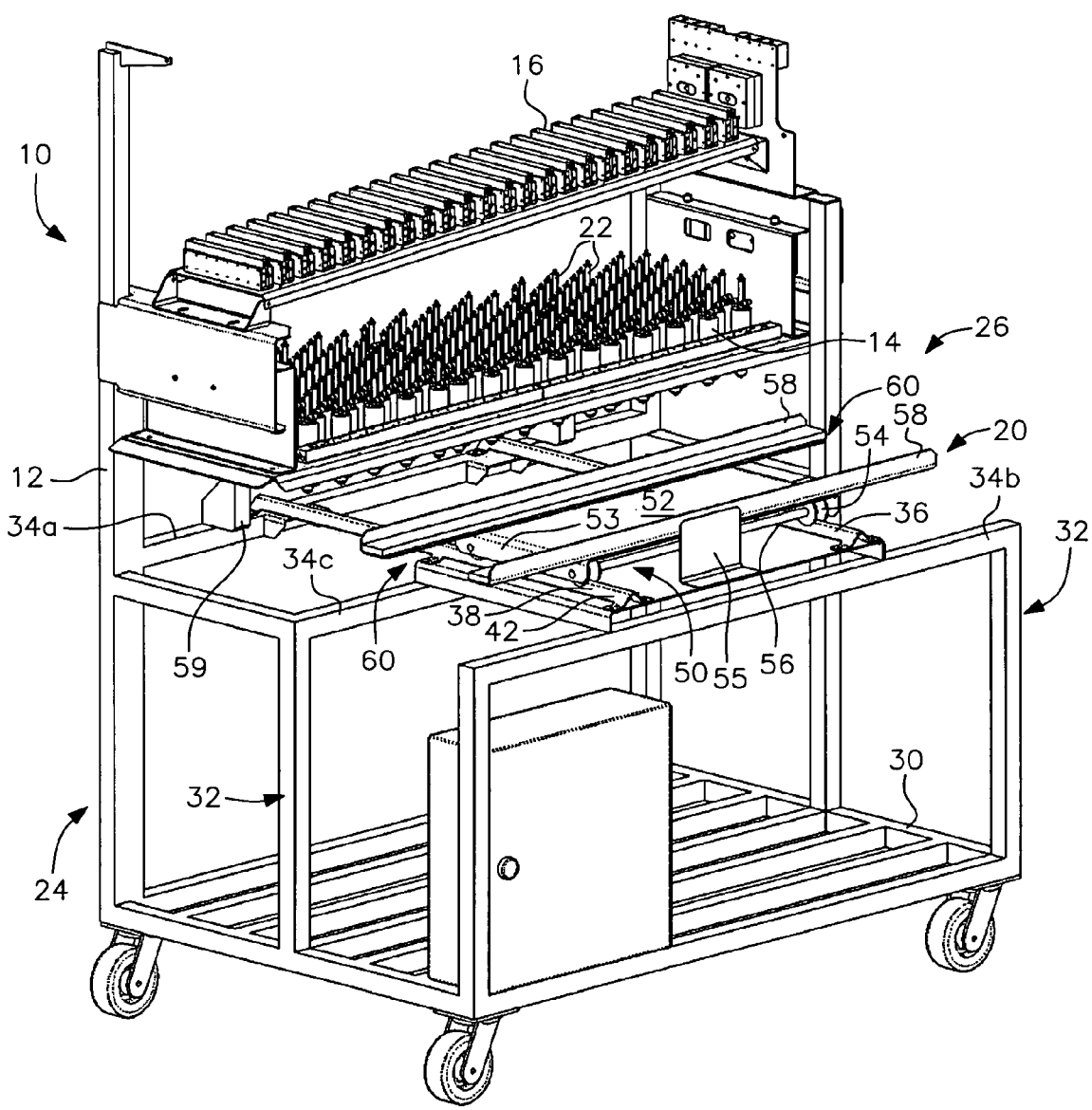
FIG. 1 is a side perspective view of an in-ovo egg injection machine in accordance with a first embodiment of the present invention, with the support cradle in the loading/unloading position.

Although only one preferred embodiment of the invention is explained in detail, it is to be understood that the embodiment is given by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 2:
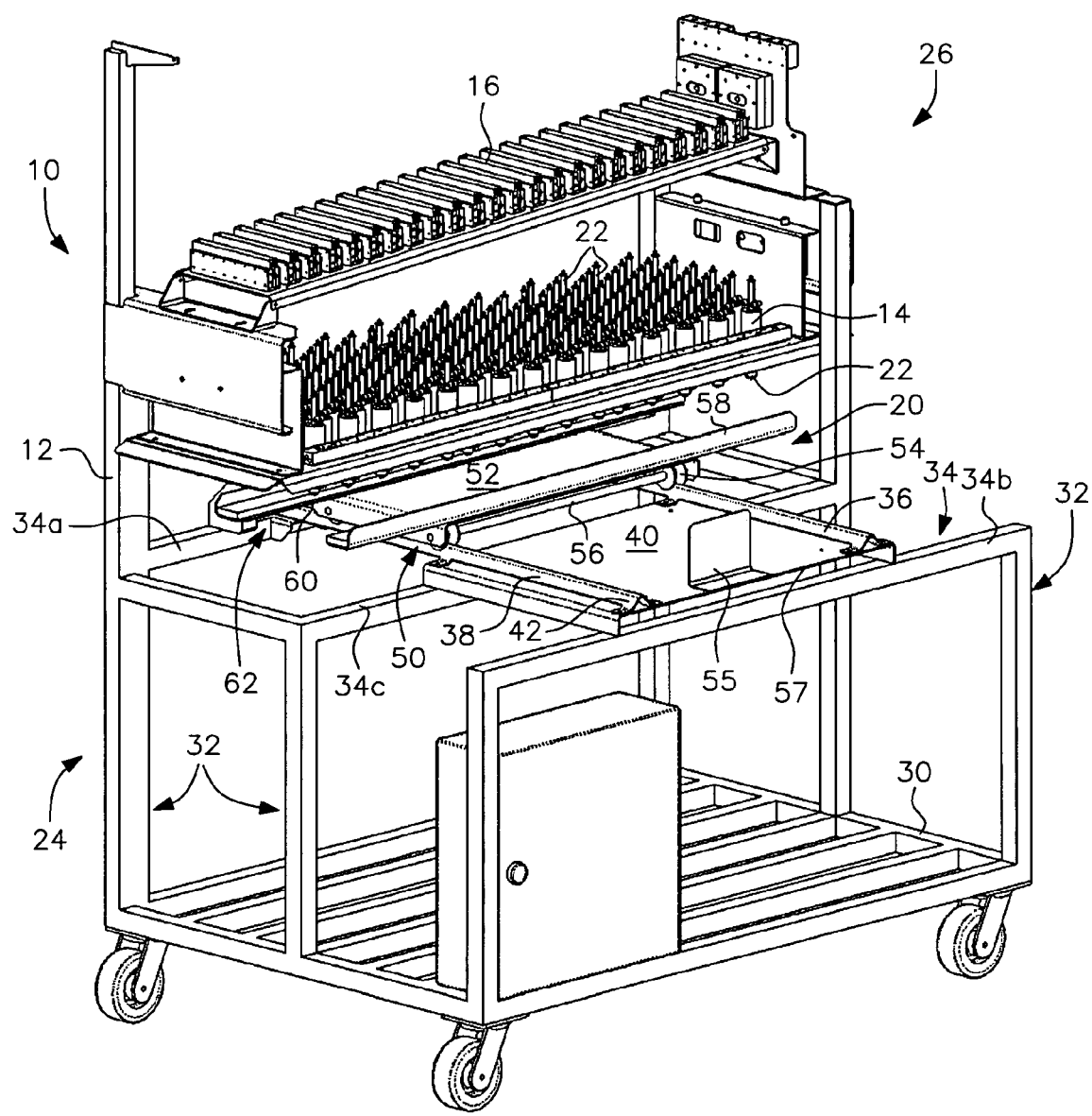
FIG. 2 is another front perspective view of the in-ovo egg injection machine of FIG. 1, with the support cradle in the injection position.

FIGS. 1 and 2 show an in-ovo egg injection machine with automated egg injection, but with manual egg loading and transfer capability in accordance with a first embodiment of the present invention, which is generally designated by the reference numeral 10. As shown, the machine 10 includes a frame 12, an injector assembly 14, a vaccine delivery system 16 and a laterally movable rail system, generally designated by the reference numeral 20. The injector assembly 14 and vaccine delivery system 16 (as well as other components including those that connect the two but are not shown) are known and fully described in the '820 patent, previously incorporated by reference. Accordingly, the present description will be directed to the aspects of the present invention which are not disclosed in the '820 patent.

The injector assembly 14 of the in-ovo egg injection machine 10 includes a plurality of injectors 22 arranged in a generally rectangular matrix that extends longitudinally between the front 24 and back 26 of the machine. The injector assembly 14 and vaccine delivery system 16 are supported on the frame 12 as shown in FIGS. 1-4.

The frame 12 includes a base 30, a plurality of vertically extending frame members generally designated by the reference numeral 32 and a plurality of horizontally extending frame members generally designated by the reference numeral 34 that extend between respective pairs of the vertically extending frame members 32. According to a preferred embodiment, these horizontally extending frame members 34 include a first outer horizontal frame member 34a, a second outer horizontal frame member 34b and a middle horizontal frame member 34c positioned between the first and second outer horizontal frame members; all three of the first outer, second outer and middle horizontal frame members 34 extend longitudinally and are generally parallel with one another. The transversely or laterally movable rail system 20 is mounted on the three horizontally extending frame members 34 as shown in FIGS. 1-4.

The rail system 20 includes two transversely extending guide rails 36, 38 that extend from the first outer horizontal frame member 34a to the second outer horizontal frame member 34b. The portion of the transverse guide rails that extends from the middle horizontal frame member 34c to the second outer horizontal frame member 34b is supported on a generally planar sheet 40 that is mounted between the middle and second outer horizontal frame members 34c, 34b and the guide rails 36, 38. The transverse guide rails, which include an outer transverse guide rail 36 proximate to the back 26 of the frame 12 and an inner transverse guide rail 38 distal from the back of the frame, are preferably angled in construction to have an inverted V-shaped upper surface 42.

The rail system 20 further includes a movable plate-like member, generally designated by the reference numeral 50, that is engaged with the upper surface 42 of the transverse guide rails 36, 38 so as to be movable thereon. According to the preferred embodiment shown, the movable member 50 includes a substantially rectangular planar support plate 52 with a roller 54 mounted adjacent each corner. Two rollers 54 ride on the inner transverse guide rail 38 and two rollers 54 ride on the outer transverse guide rail 36. Each respective pair of opposed guide rollers is joined by an axle 56 that is mounted on a depending side edge 53 of the plate 52.

Figure 3:
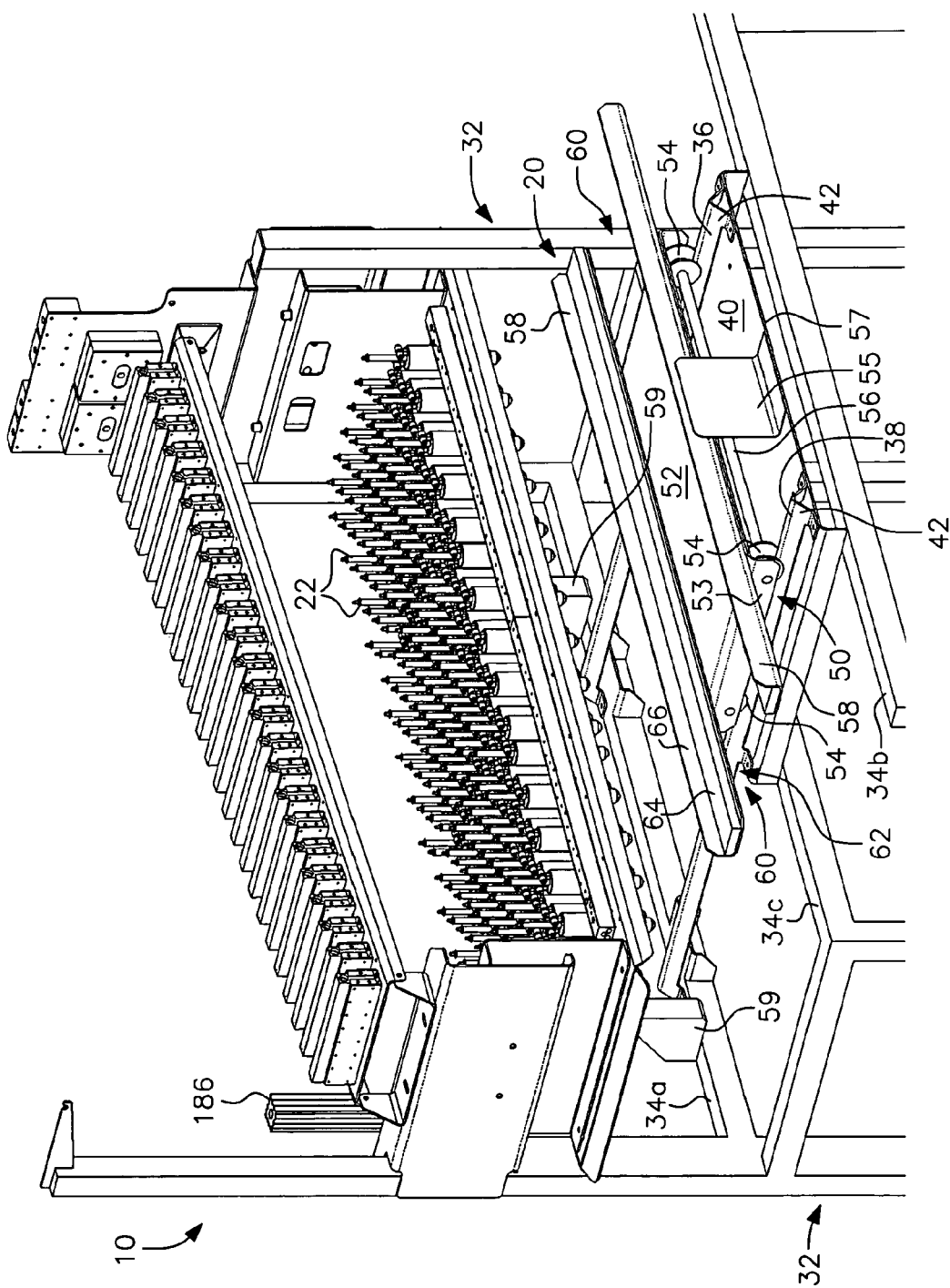
FIG. 3 is a close-up view similar to FIG. 1 with the in-ovo egg injection machine in the loading/unloading position.
Figure 4:
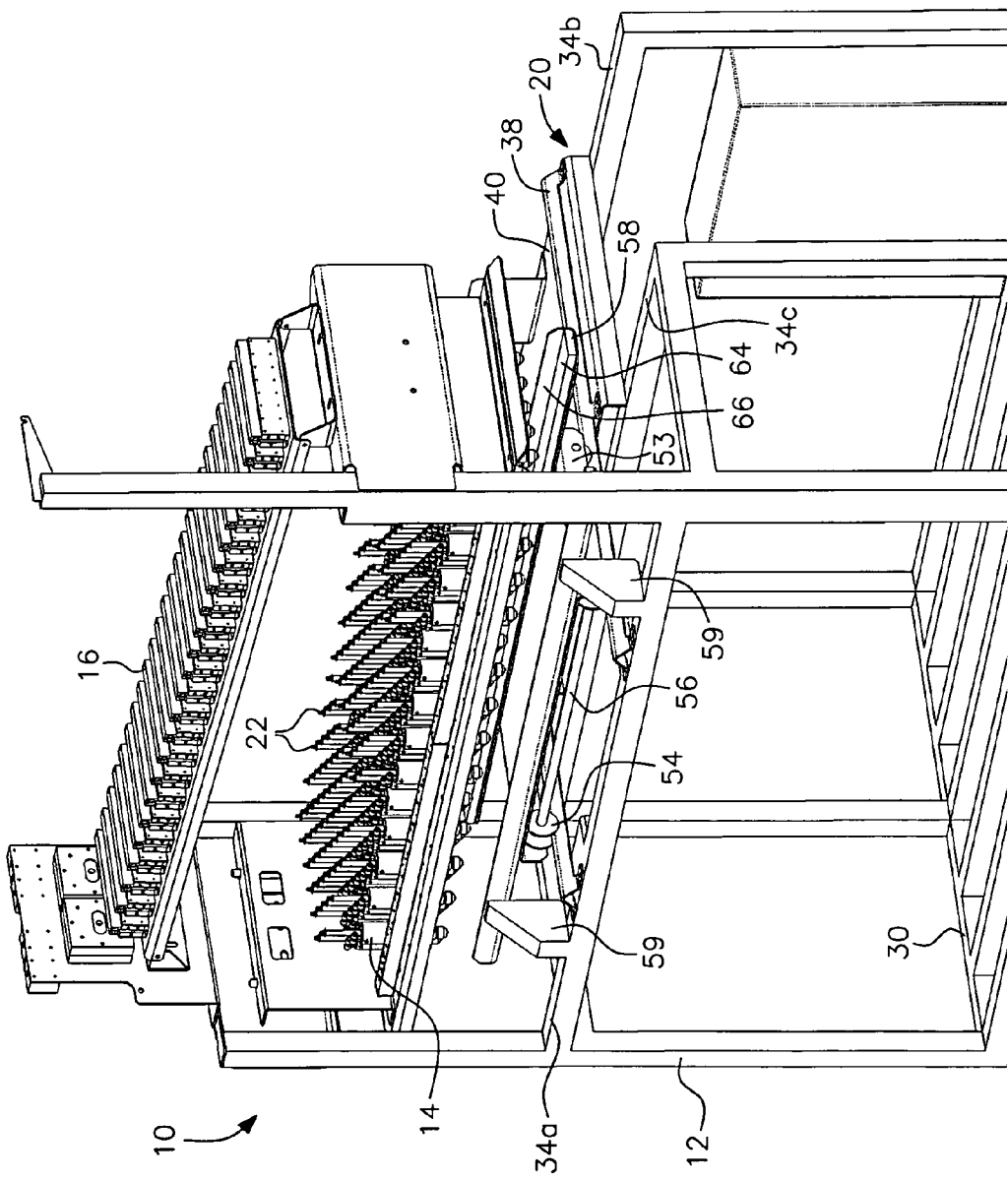
FIG. 4 is a close-up view of the in-ovo egg injection machine as shown in FIG. 2, with the traveling support cradle in the injection position, but seen from the opposite side.

Also included in the rail system 20 are two longitudinally extending opposed support rails 58 that are substantially parallel with the horizontally extending frame members 34. The support rails 58 are mounted as by welding or the like to the upper surface of the plate 52 in a spaced relationship that defines a support cradle, generally designated by the reference numeral 60. The support cradle 60 with longitudinal support rails 58 is thus movable laterally between an injection position directly under the injector assembly 14 to a loading/unloading position (as shown in FIGS. 1 and 3) parallel with but spaced away from the injector assembly 14.

An upstanding bracket 55 is mounted on the upper surface of plate 40 intermediate the transverse guide rails 36 and 38 adjacent the outermost end 57 of plate 40, which bracket 55 serves as a stop for the support cradle 60 in its loading/unloading position. Similar stops 59 are mounted on the upper surface of first outer horizontal frame member 34a to limit and position the support cradle 60 in the injection position underneath the injector assembly 14.

Incubated eggs that are ready to be injected are typically arranged in an egg tray 70 (see FIG. 6) that holds the eggs in a matrix arrangement. To load the eggs into the machine 10, the operator places at least one egg tray 70 onto a generally flat egg tray pan 80 such as that shown in FIG. 5. The egg tray pans 80 are conventional and provided by the hatchery.

Figure 6:
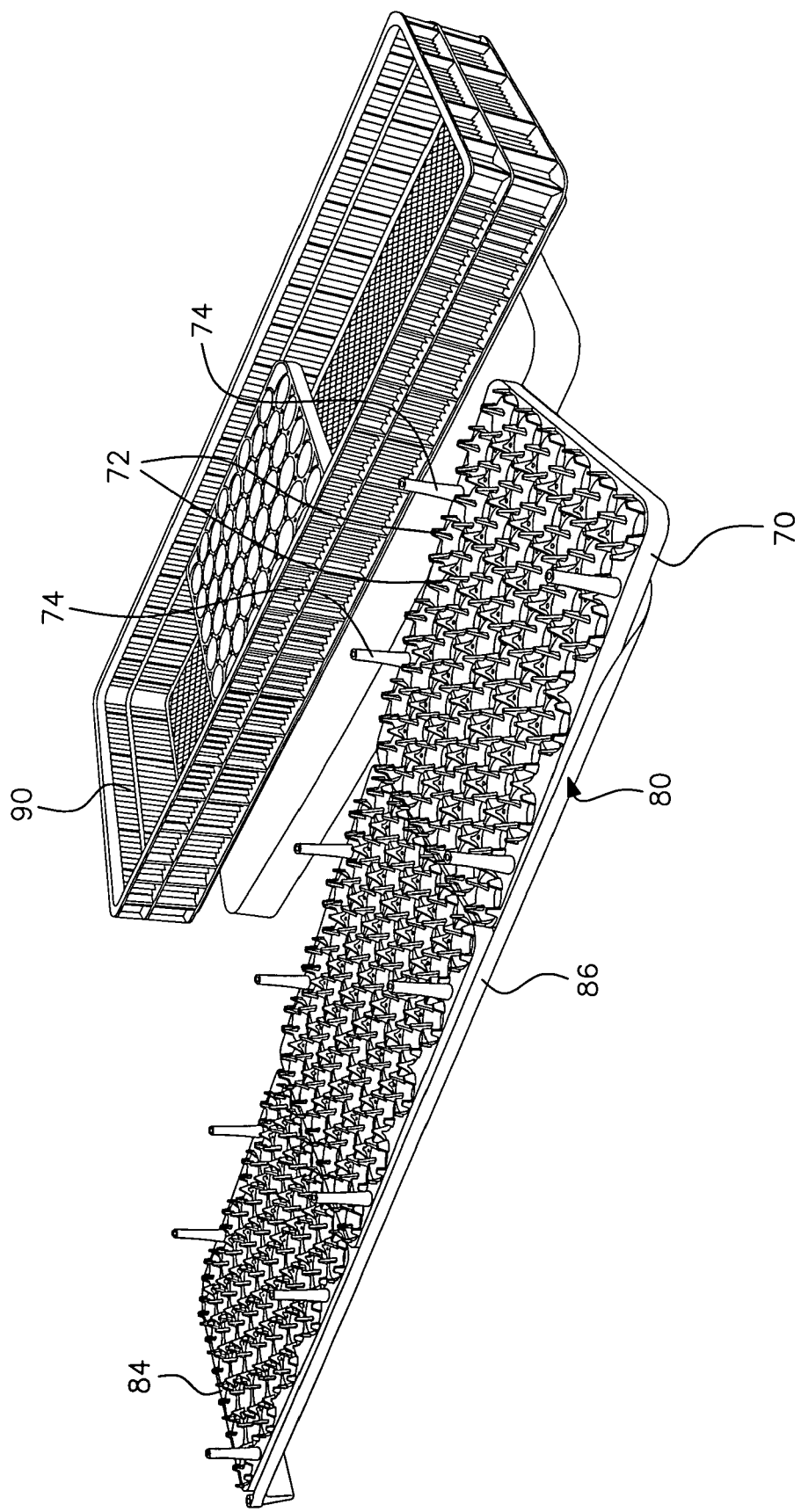
FIG. 6 is a photograph of the egg tray pan of FIG. 5, with three egg trays thereon.

Hence, the pan 80 is sized to correspond with the egg trays 70, and a pan 80 is preferably loaded with three egg trays 70 as shown in FIG. 6. The opposed longitudinal support rails 58 are then sized and spaced to support the pans and egg-loaded trays of a particular hatchery so that the eggs are correctly aligned laterally underneath the injectors 22 of the injector assembly 14. And, the injector matrix of the injector assembly 14 is also specially configured to correspond with the matrix arrangement of the eggs in the hatchery's incubating trays and pans.

Figure 5:
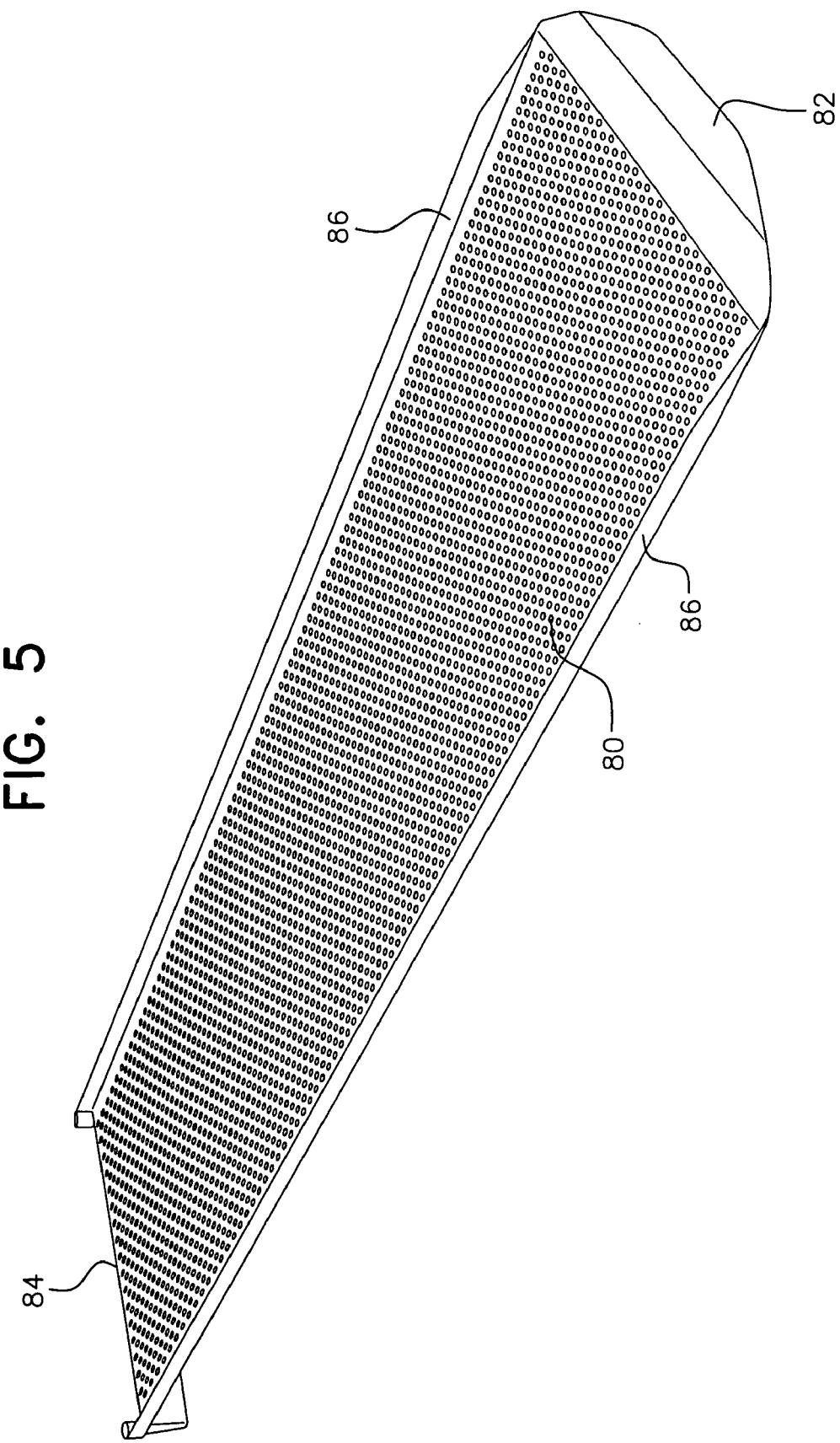
FIG. 5 is a photograph of a conventional egg tray pan for use with the in-ovo egg injection machine of the foregoing figures.

As can be seen in FIG. 5, the pan 80 has a flat insertion end 82 and an open stop end 84. The longitudinal edges 86 of the pan are bent upwardly to securely position the egg trays laterally. Thus, the egg trays are prevented from sliding laterally off the pan.

To place the pan into position, two approaches may be taken. According to a first approach, the insertion end 82 of the pan 80 is placed in the front, generally designated by the reference numeral 62, of the support cradle 60 so that the pan rests on the horizontal surfaces 64 of the support rails and is prevented from moving laterally by the vertical sides 66 of the support rails 58. The operator then pushes the loaded pan onto the support rails 58 by sliding it on the horizontal support rail surfaces 64.

According to a second approach, the pan 80 is lifted over the support cradle 60 from the side of the machine and placed onto the support rails 58 so that the pan rests on the horizontal surfaces 64 of the support rails. As when using the first approach, the pan is prevented from moving laterally by the vertical sides 66 of the support rails 58.

Figure 7:
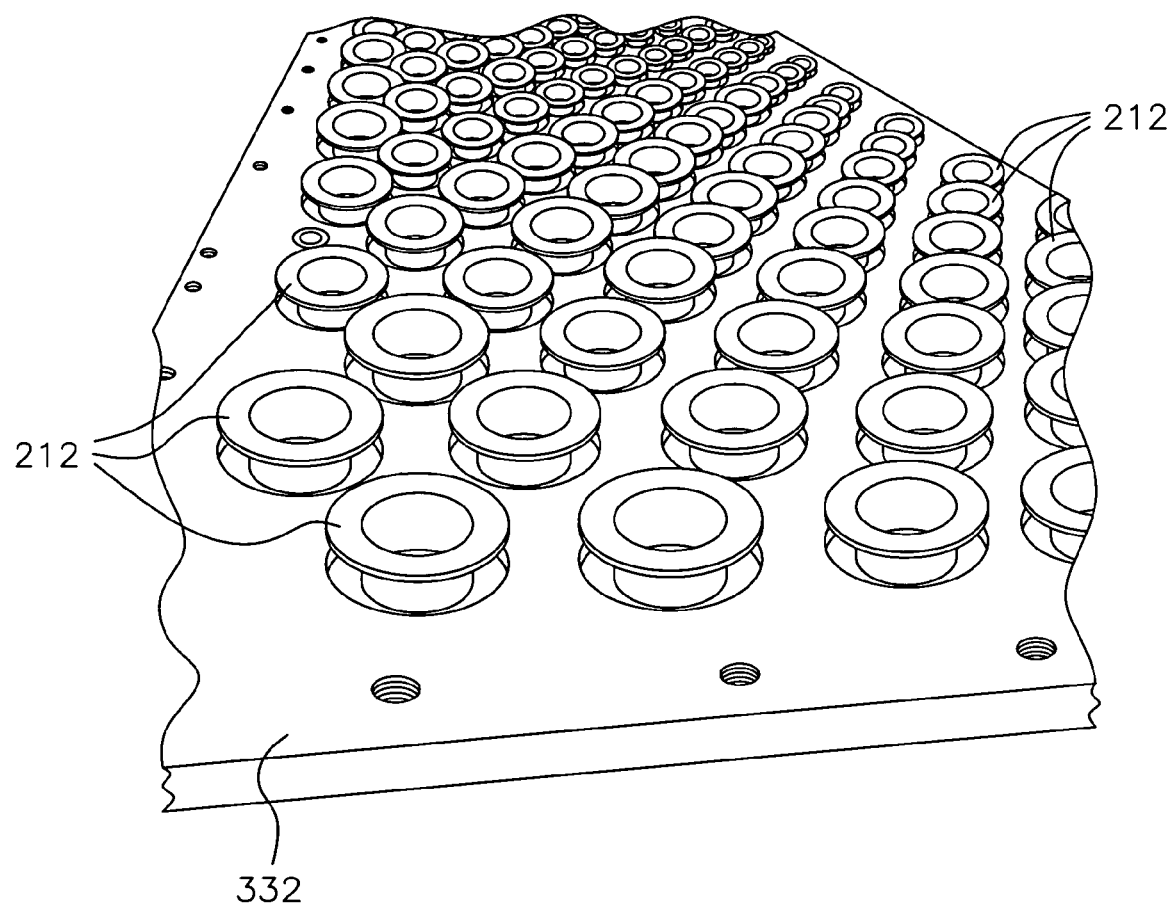
FIG. 7 illustrates a representative support plate with gripper rings used to secure the injectors during injection.

With the egg trays and pan 80 positioned on the support rails 58, and the support cradle 60 in the loading position, the operator then rolls the support cradle laterally along the guide rails 36, 38 into the injection position where the eggs are to be injected. The operator then pushes a button to automatically activate the injection sequence. During injection the injectors, which are supported in a respective plurality of openings 337 in a support plate 332, are gripped by inflatable gripping elements 212 respectively received within the openings 337 as shown in FIG. 7. The support plate 332 is preferably lowered by one or more pneumatic cylinders 186 (see FIG. 3) which move the injector assembly in a substantially vertical direction between a down position in which the injectors can contact and inject the eggs, and an up position in which the injectors are spaced from the eggs. A fuller description of the injection sequence is set forth in the '820 patent.

Several cone-shaped bushings (not shown) are mounted underneath the injector assembly 14, and face downwardly to engage upstanding spacer towers 74 (described hereafter) on the egg trays 70. Thus, as the injector assembly 14 reaches its lowermost position, the engagement of the cone-shaped bushings onto the upstanding spacer towers 74 longitudinally aligns the egg trays 70 on the pan 80, thus assuring proper positioning of the eggs to be injected with their respective injectors 22. Once the injection sequence has been completed, the injector assembly 14 raises to its starting "home" position.

Figure 9:
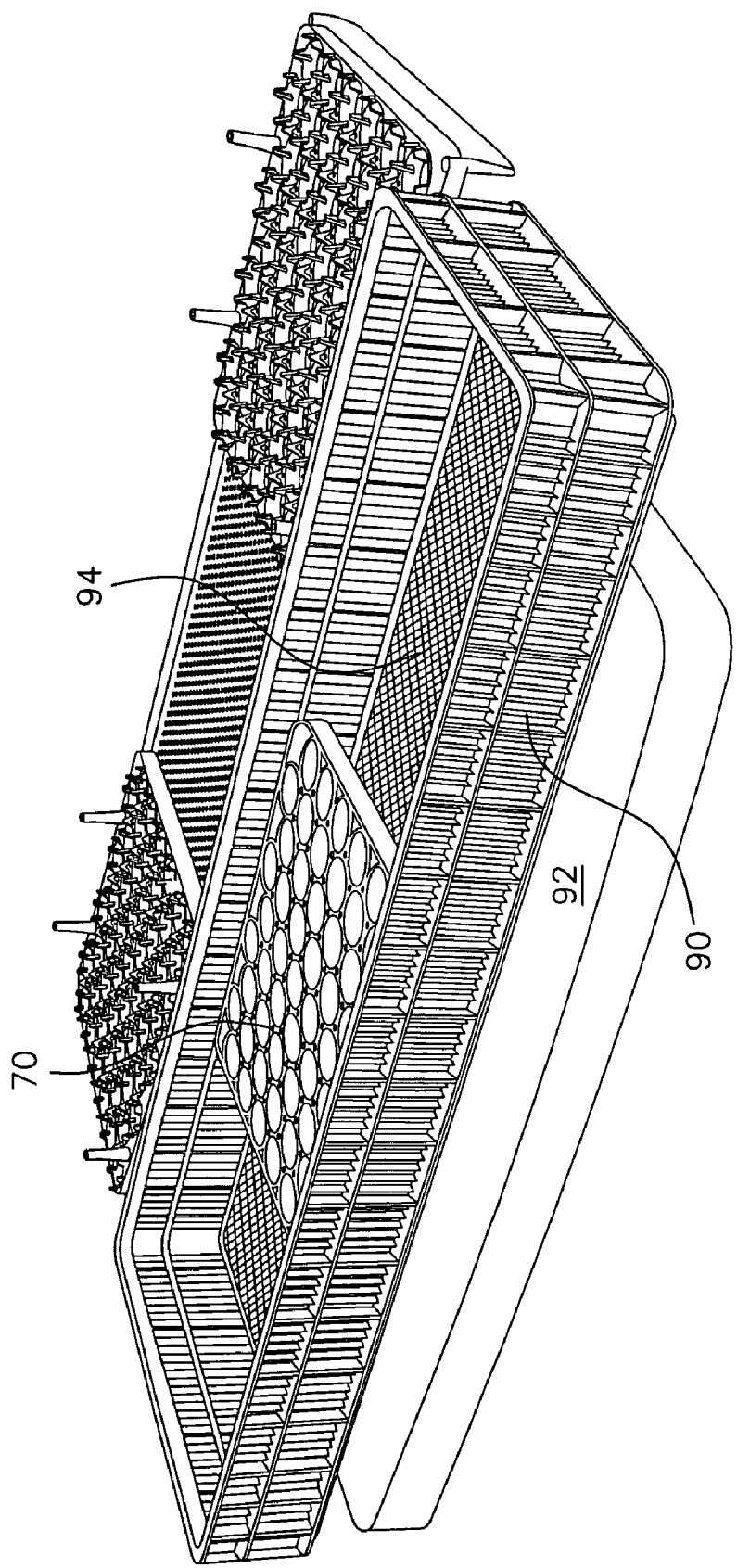
FIG. 9 is a photograph of a hatching tray with a single egg tray therein.

Following injection, the operator simply rolls the support cradle 60 back to the loading/unloading position and removes the pan 80 with the egg trays 70 still thereon in order to transfer the injected eggs to a hatching basket 90 (see FIG. 9). During this time, the previously noted injector and injection needle sanitizing cycle is completed as will be described more fully hereinafter. Following sanitization, the machine 10 is ready to receive a new batch of eggs for injection.

Figure 8D:
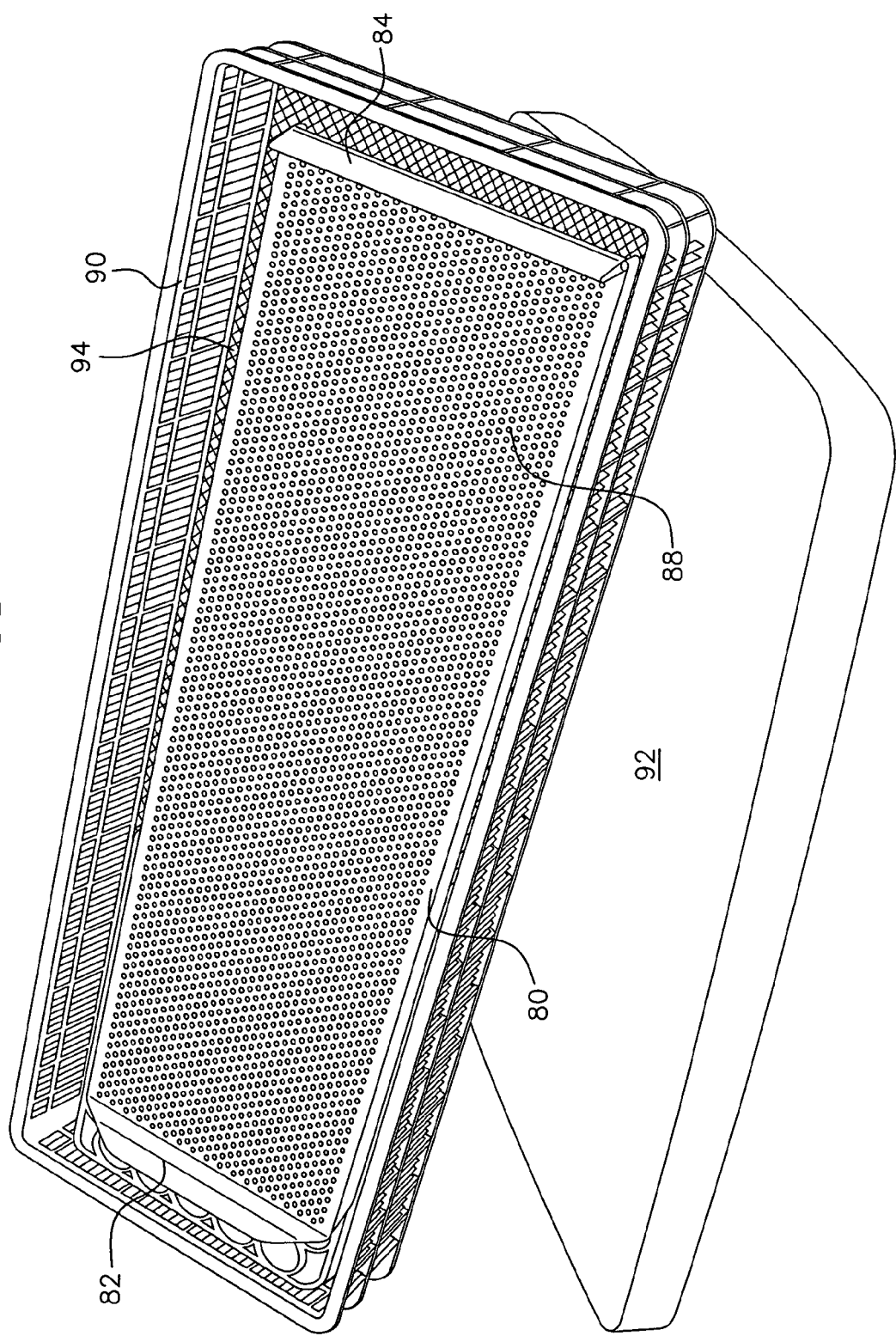

The process by which the eggs are transferred from the egg trays 70 to the hatching basket 90 is shown in the photographs of FIGS. 8A-8E. Starting with FIG. 8A, the pan 80 and egg trays 70 are preferably placed on a flat surface such as a table 92. A hatching tray 90 is turned upside down and lowered over the egg trays 70. As can be seen, the egg trays are made with egg positioning pins 72 that keep the eggs in their matrix arrangement, and with spacer towers 74 that allow multiple egg flats to be stacked without crushing the eggs. Similarly, in the transfer process shown, the spacer towers 74 serve to prevent the hatching tray 90, once fully lowered over the eggs trays as shown in FIG. 8B, from crushing the eggs.

Preferably using two people as shown in FIGS. 8C and 8D, the bottom 88 of the pan 80 is then supported to keep the egg trays in abutment with the bottom 94 (see FIG. 9) of the hatching basket 90 and the pan 80, egg trays 70 and hatching basket 90 are rotated to bring the hatching basket right side up. The pan can then be removed as shown in FIG. 8E, leaving the inverted egg trays resting on the bottom 94 of the hatching basket. With the eggs now being supported by the hatching basket, the egg trays can be removed. FIG. 9 shows a single egg tray 70 still remaining in the hatching tray 90 while the other two have been removed. The eggs, while not shown, would be resting on the bottom of the hatching tray.

Figure 10:
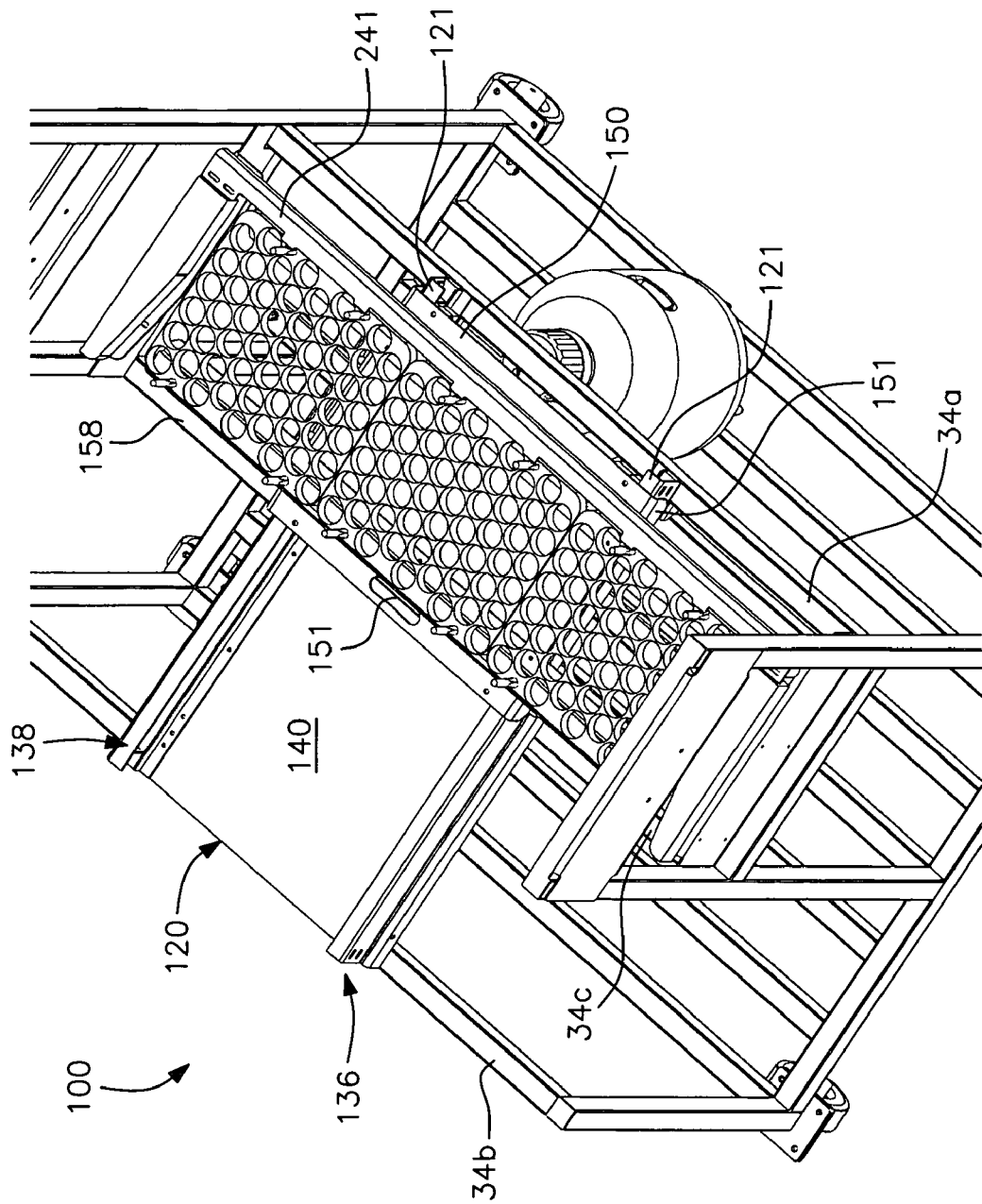
FIG. 10 is a top perspective view of an in-ovo egg injection machine in accordance with a second embodiment of the present invention showing the support cradle with egg trays thereon in the injection position.
Figure 11:
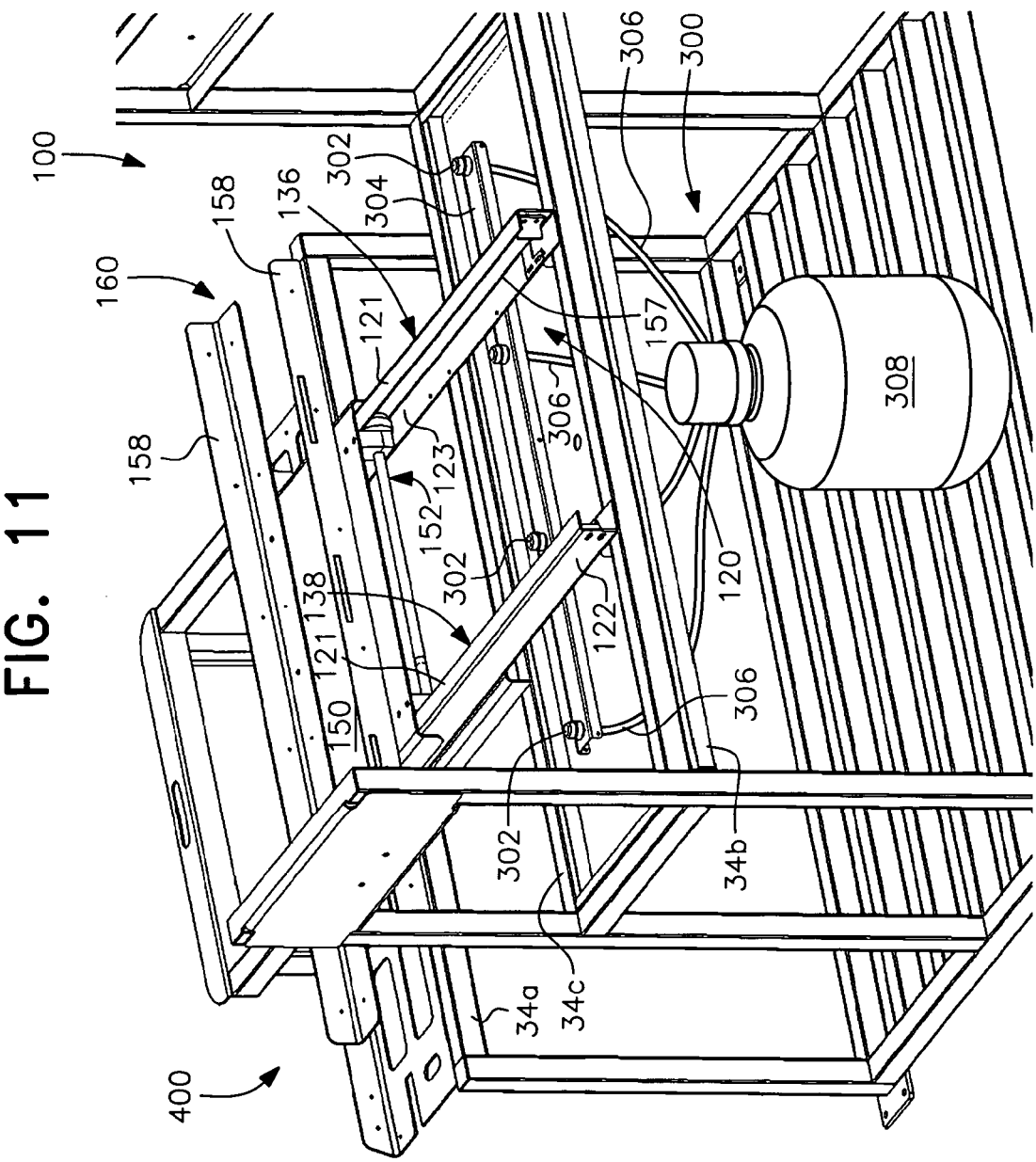
FIG. 11 is another perspective view of the in-ovo egg injection machine of FIG. 10 as shown from the injection side thereof with the support cradle in the loading/unloading position and with an optional egg tray support platform coupled to the front of the machine.

FIGS. 10 and 11 show a second embodiment of an in-ovo egg injection machine with automated egg injection and manual egg loading and transfer capability in accordance with the present invention, which is generally designated by the reference numeral 100. The machine 100 includes a frame 12, an injector assembly 14, and a vaccine delivery system 16 that substantially correspond with those in the first embodiment and therefore the description thereof will not be repeated.

Figure 12:
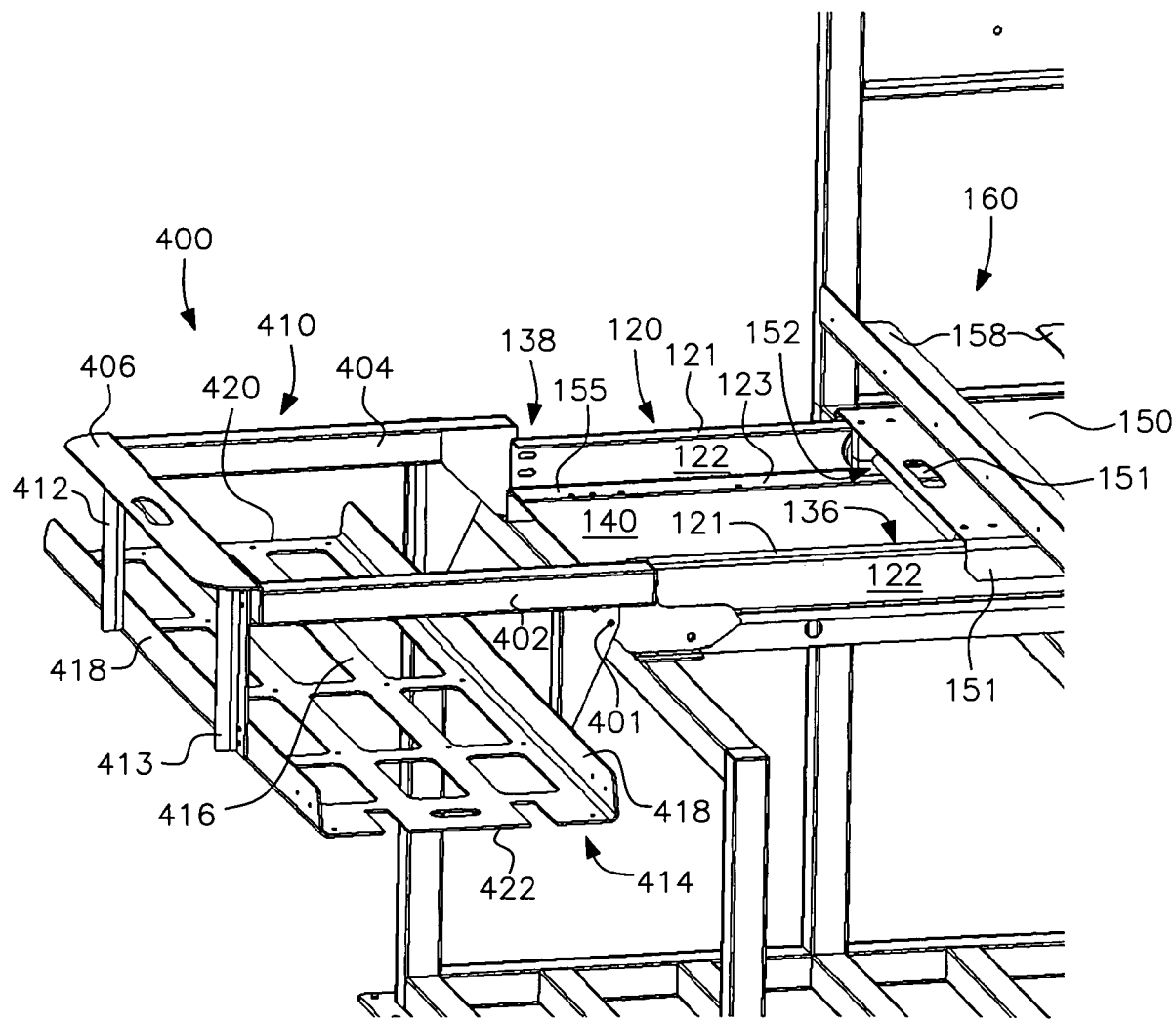
FIG. 12 is a perspective view of the optional egg tray support platform of FIG. 11.
Figure 13:
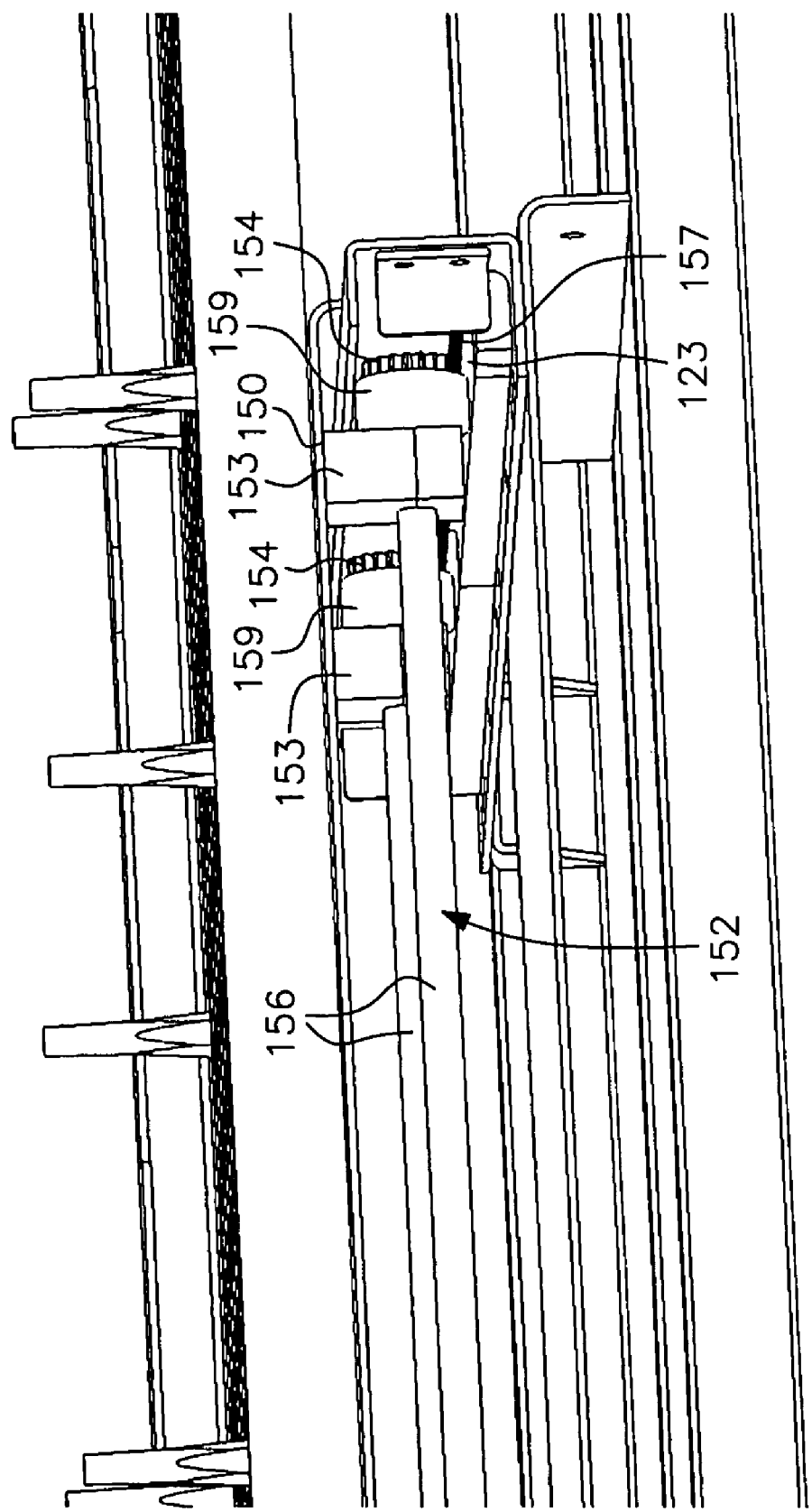
FIG. 13 is a perspective view of the toothed rollers with connecting axles that roll on the guide rails and engage with a corresponding rack for moving the support plate in accordance with second embodiment of FIG. 10.
Figure 14:
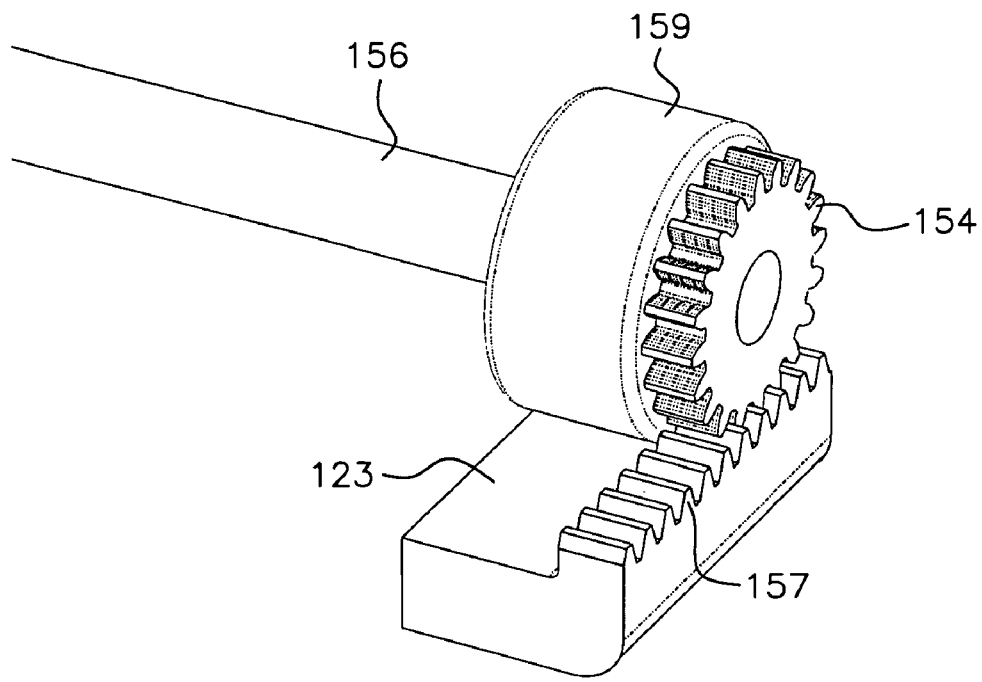
FIG. 14 is an enlarged view of one of the toothed rollers and a portion of the guide rail of FIG. 13.
Figure 15:
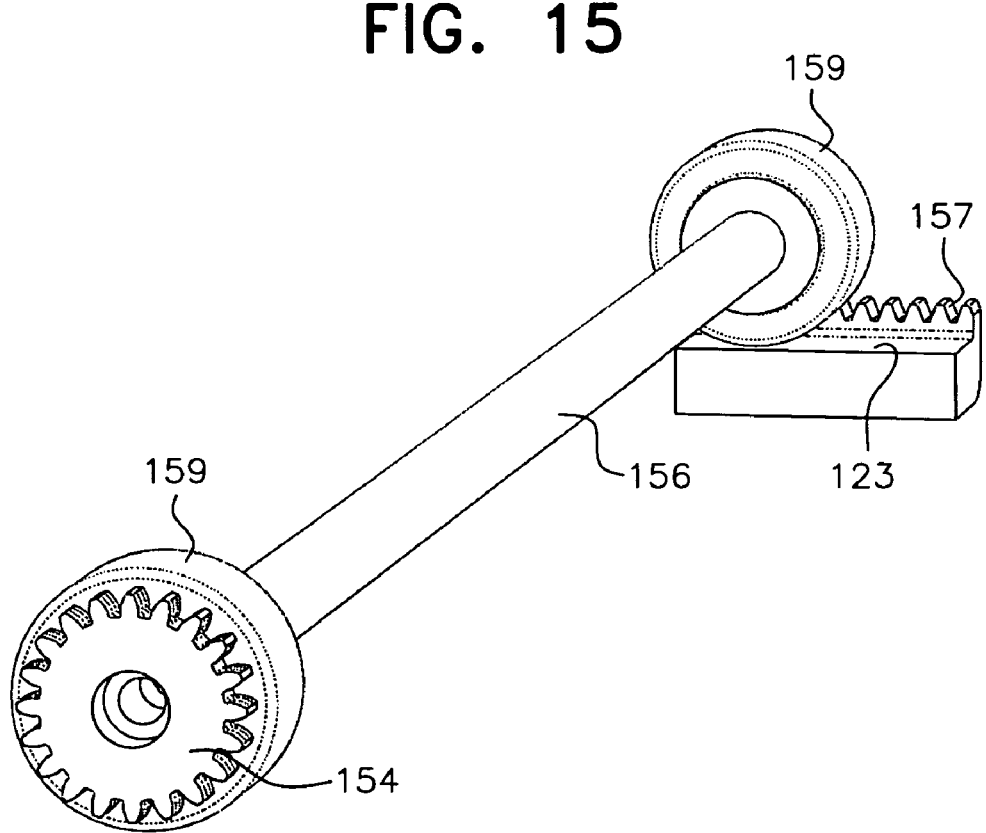
FIG. 15 is a perspective view of one of the axles of FIG. 13 with two toothed rollers thereon.
Figure 16:
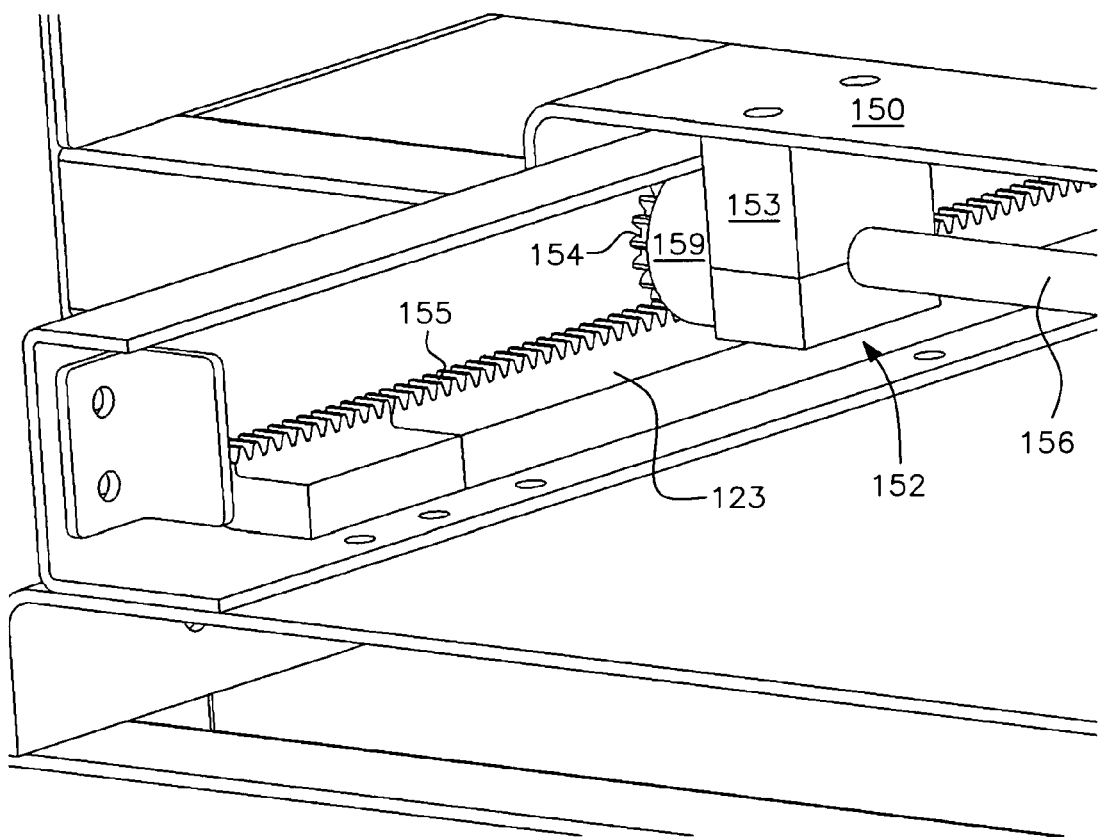
FIG. 16 is a perspective view of the loading side of the in-ovo injection machine of FIG. 10 showing the toothed rollers engaged with the rack.

The machine in accordance with the second embodiment includes a laterally movable rail system, generally designated by the reference numeral 120. The rail system 120 includes two transversely extending guide rails, generally designated by the reference numerals 136 and 138, that extend from the first outer horizontal frame member 34a to the second outer horizontal frame member 34b. The portions of the transverse guide rails 136, 138 that extend from the middle horizontal frame member 34c to the second outer horizontal frame member 34b are supported on a generally planar sheet 140 that is mounted between the middle and second outer horizontal frame members 34c, 34b and the guide rails 136, 138. The transverse guide rails, which include an outer transverse guide rail 136 proximate to the back 26 of the frame 12 and an inner transverse guide rail 138 distal from the back of the frame, have a C-shaped cross-section with a top face 121, a side face 122 and a bottom face 123. A movable plate-like member 150 rides above the top face 121 and includes flanged edges 151 that fit over and ride along the side faces 122 as shown in FIGS. 11 and 12. The movable plate member 150 preferably includes a hand hold opening 151 on its loading/unloading side to facilitate movement of the plate and supported egg trays (and eggs) into and out of the machine.

According to the preferred embodiment shown in FIGS. 13-16, the movable member 150 is mounted on a rolling assembly, generally designated by the reference numeral 152. The rolling assembly 152 includes support blocks 153 affixed to the underneath side of movable plate 150, a plurality of toothed rollers 154 with a corresponding plurality of wheels 159, and a plurality of axles 156 joining respective pairs of opposed toothed rollers 154 and wheels 159. The axles 156 pass through the support blocks 153 which couple the rolling assembly 152 to the underside of the movable member 150.

According to the preferred embodiment shown, there are four toothed rollers 154 arranged on two axles 156, although the present invention is not limited to only this construction. One toothed roller 154 and wheel 159 is mounted adjacent each corner of the movable member 150. Each pair of toothed rollers is engaged with a pair of racks 155 and 157 mounted on or integral with the bottom faces 123 of the guide rails 136, 138. Two rollers 154 ride on the rack 155 of the inner transverse guide rail 138 and two rollers 154 ride on the rack 157 of the outer transverse guide rail 136. The fixed nature of the axles with respect to the wheels, and the toothed engagement between the racks and the rollers 154, ensures that the wheels 159, which ride on the bottom faces 123 of the guide rails 136, 138, rotate together for smooth and even transverse movement of the movable plate 150.

Also included in the rail system 20 are two longitudinally extending support rails 158. The support rails 158 are mounted as by welding or the like to the upper surface of the plate-like member 150 in a spaced relationship that defines a support cradle, generally designated by the reference numeral 160. The support cradle 160 with longitudinal support rails 158 is thus movable laterally back and forth between the injection position directly under the injector assembly 14 and the loading/unloading position parallel with but spaced away from the injector assembly 14.

Figure 17:
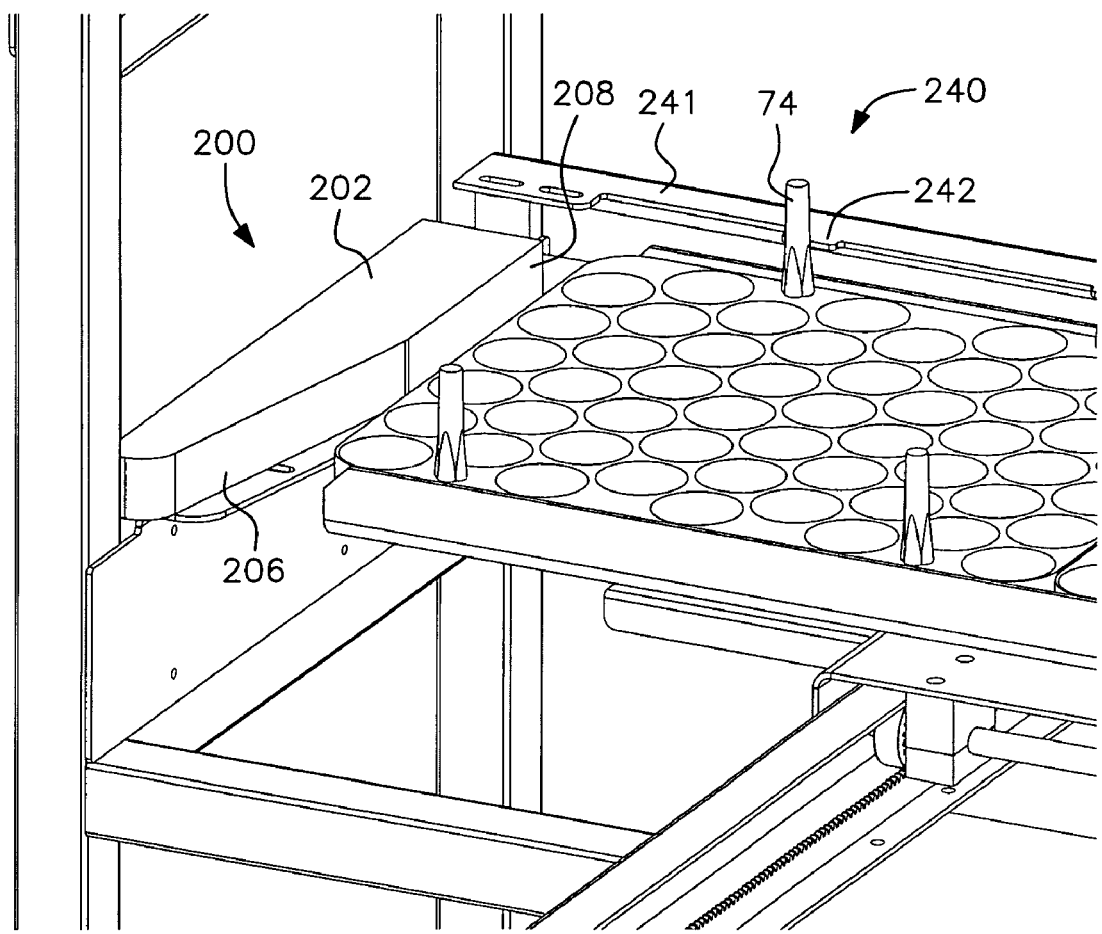
FIG. 17 is a perspective view from the loading side of the in-ovo injection machine of FIG. 10 showing the left ramped guide arm with an egg tray in the injection position.
Figure 18:
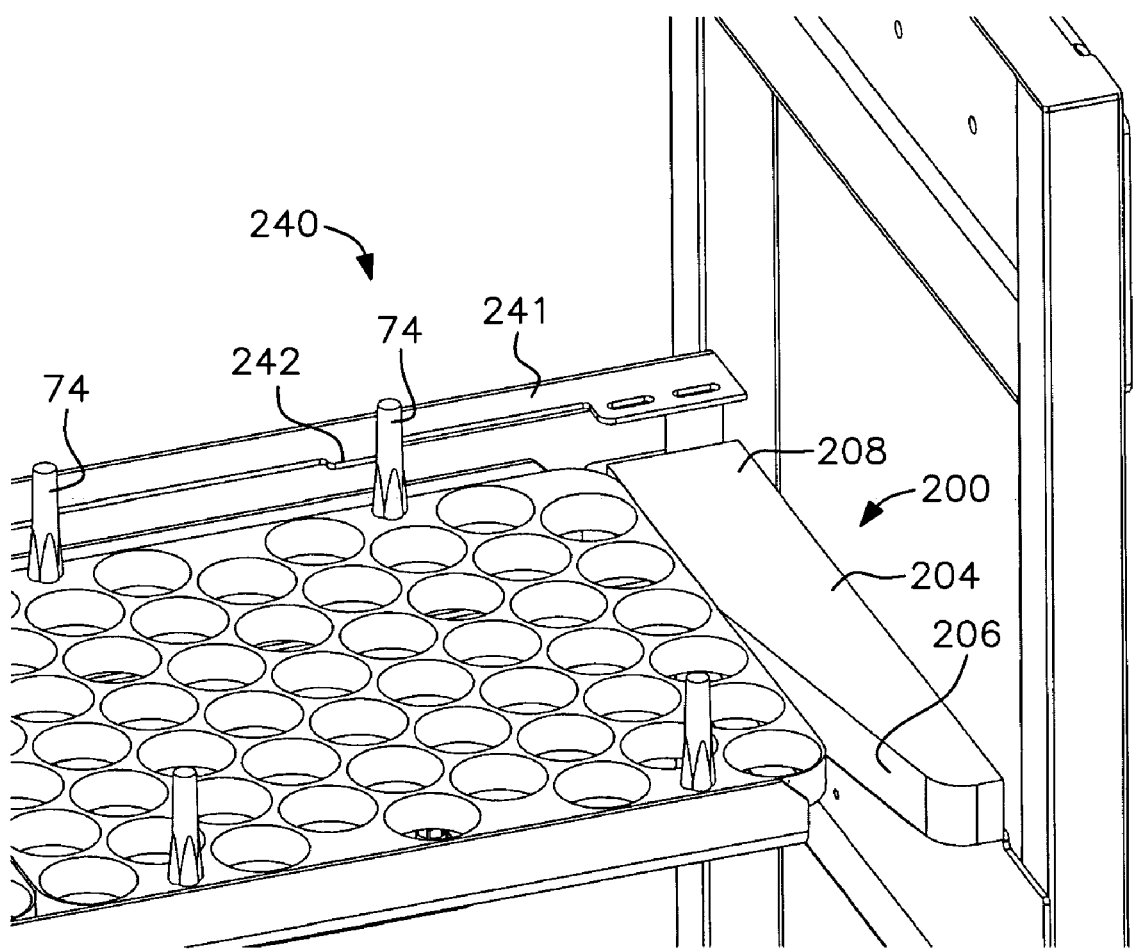
FIG. 18 is another perspective view of the structure shown in FIG. 17 showing the right ramped guide arm.

To ensure that the egg trays are properly centered in the support cradle prior to injection, the frame is provided with a longitudinal centering mechanism shown in FIGS. 17 and 18 and generally designated by the reference numeral 200. In the embodiment shown, the longitudinal centering mechanism 200 includes two tapered guide arms, a front arm 202 positioned adjacent the front of the frame as shown in FIG. 17 and a rear arm 204 positioned adjacent the back of the frame as shown in FIG. 18. Each tapered guide arm 202, 204 has an angled entry surface 206 facing the loading/unloading side of the frame and a generally rectangular base 208 adjacent the injection side of the frame. If the egg trays in the pan are offset to either the front or the back of the cradle 160, the angled entry surface 206 of either the front or the rear arm 202, 204, respectively, guides the egg trays into a front-to-back centered position in the cradle 160 between the guide arm bases 208. In this longitudinally centered position, the eggs are in longitudinal alignment with the injectors for the injection sequence. The tapered guide arms are preferably made of high density polyethylene or other low friction material to facilitate the sliding movement of the egg trays thereagainst.

Figure 19:
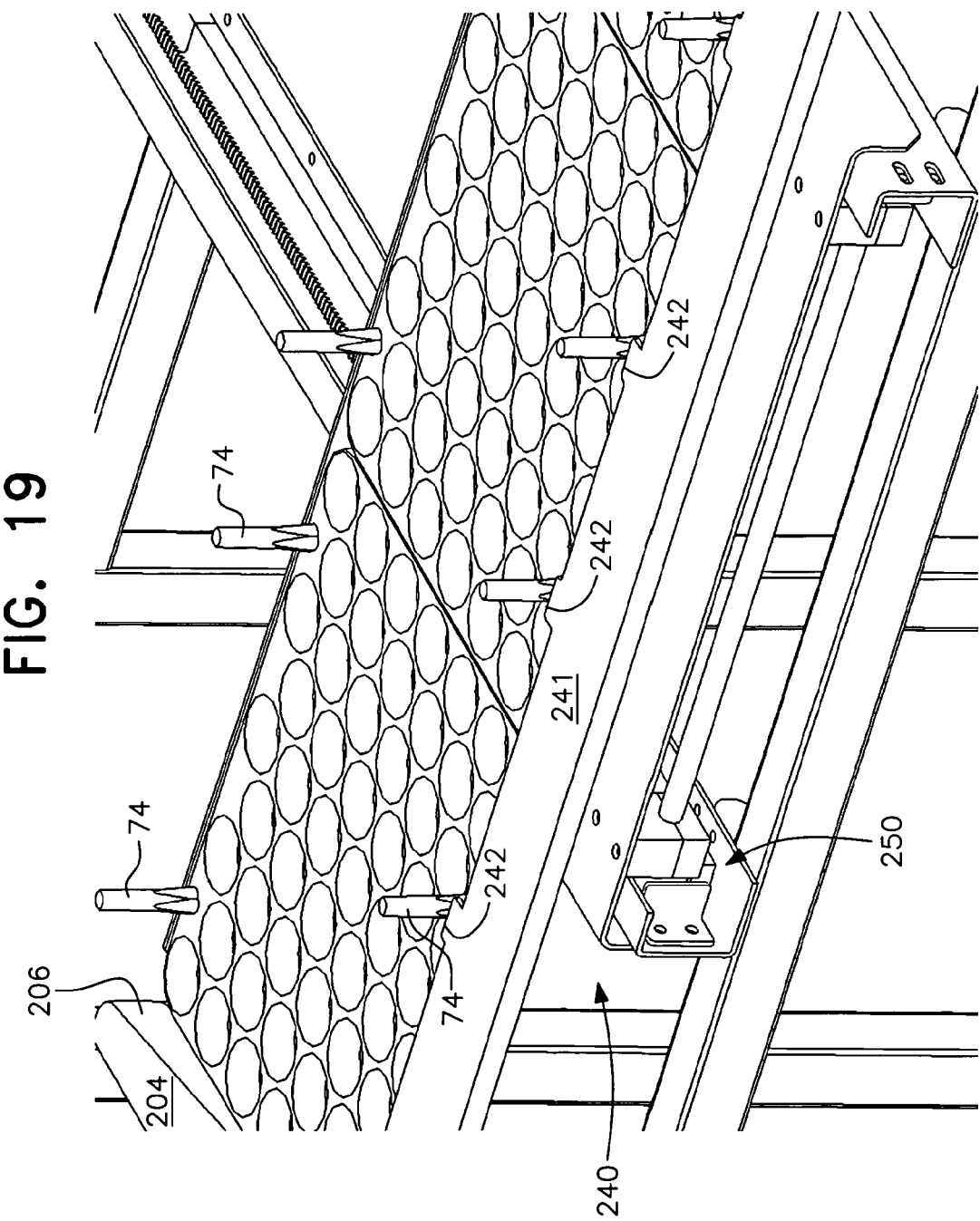
FIG. 19 is a further perspective view of the structure shown in FIG. 18 as shown from the injection side.
Figure 20:
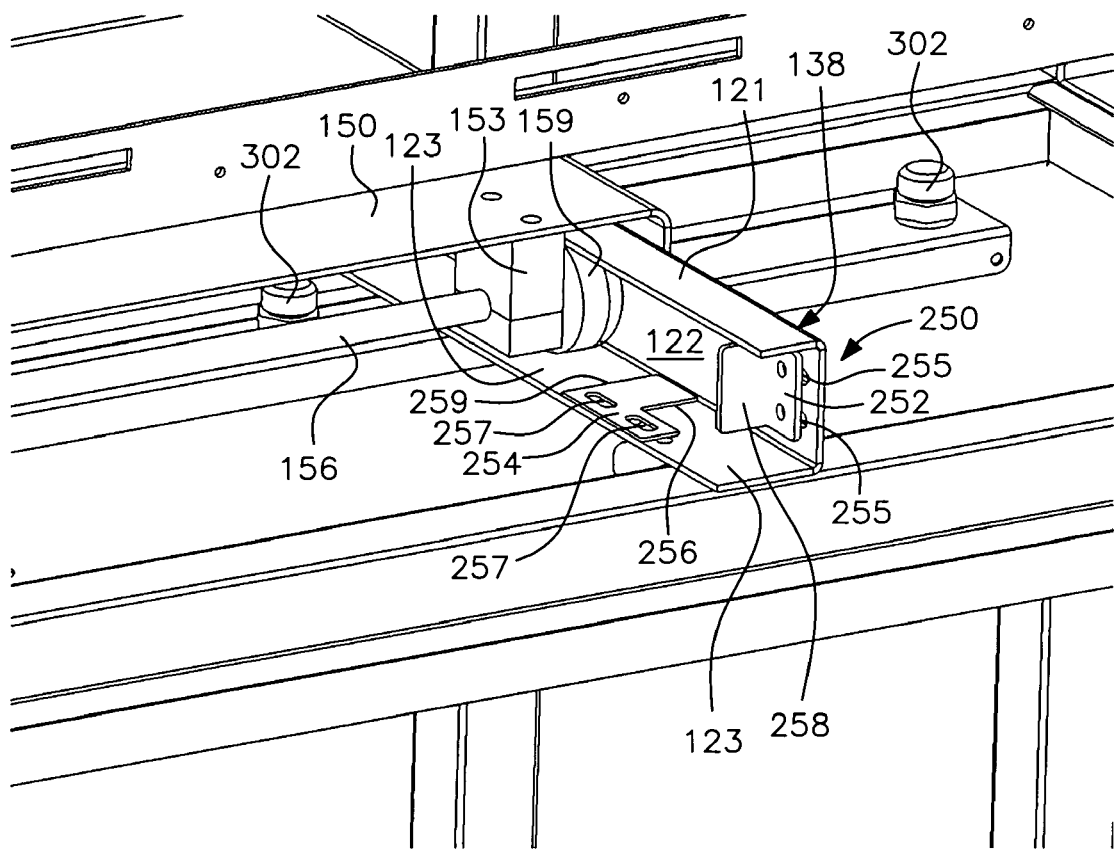
FIG. 20 is a perspective view from the injection side of the in-ovo injection machine of FIG. 10 showing a track end indicator in accordance with the present invention.

In addition to being in longitudinal alignment, the eggs must also be in lateral alignment with the injectors. This positioning is provided by a lateral alignment mechanism generally designated by the reference numeral 240. The lateral alignment mechanism 240 includes a crossbar 241 and egg tray backstops 242 as shown in FIGS. 17-19, and a rolling assembly placement device generally designated by the reference numeral 250 as shown in FIG. 20.

The egg tray backstops 242 extend toward the loading-side support rail 158 and are spaced from one another at distances that correspond with the spacing of the spacer towers 74 on the incubating tray 70. When the egg trays have been moved into the proper position for injection, the backstops 242 come into contact with the spacer towers 74. The backstops 242 can be reconfigured to contact other upstanding side elements of the egg tray depending on the type of egg tray used by the hatchery.

The rolling assembly placement device 250 includes an L-shaped vertical stop bracket 252 mounted on the side face 122 of the guide rails 136, 138 and a substantially flat horizontal placement bracket 254 mounted on the bottom face 123 of the guide rails. Each of these brackets 252, 254 is preferably adjustable, as with slots 255, 257, to adjust the distance of the brackets from the injection side of the frame in order to accommodate egg trays of various sizes.

When properly positioned, the wheels 159 of the rolling assembly 152 will roll rearwardly over the placement brackets 254 and then step down onto the guide rail bottom face 123 between a rear edge 256 of the placement brackets 254 and the projecting side 258 of the stop bracket 252 when the movable member 150 has reached the injection position. This physical step-down as the wheels move over the placement bracket provides the operator with a positive indication through tactile feedback that the movable member and egg trays have reached the fully-inserted injection side position. At the same time, the stop bracket 252 ensures that further movement of the rolling assembly 152 past the injection position is prevented while the rear edge 256 of the placement bracket 254 prevents any retraction of the rolling assembly toward the loading side prior to or during injection. The front edge 259 and rear edge 256 of the placement brackets are also preferably tapered to improve the rolling action thereover.

Other mechanisms for obtaining longitudinal and lateral alignment could also be used as would be understood by persons of ordinary skill in the art.

Following injection, the operator rolls the support cradle 160 back to the loading/unloading position and removes the pan 80 with the egg trays 70 still thereon in order to transfer the injected eggs to a hatching basket 90 (see FIG. 9). During this time, the injector and injection needle sanitizing cycle is operating after which the machine 100 is ready to receive a new batch of eggs for injection.

The injector and injection needle sanitizing cycle is carried out using a sanitization assembly generally designated by the reference numeral 300 and shown in FIG. 11. The sanitization assembly 300 includes a plurality of upwardly directing spray nozzles 302 rigidly mounted on a support bracket 304 held and spaced below the injectors. Sanitizing fluid supply conduits 306 are attached to each nozzle 302, with the ends of the conduits being connected to a fluid supply container 308. The sanitizing fluids in the containers are under pneumatic pressure which forces the appropriate fluid out of the nozzles when the sanitizing cycle is underway. Preferably, the sanitization assembly is computer controlled as in the '820 patent, but a manually initiated sanitizing cycle could also be implemented.

The process by which the eggs are transferred from the egg trays 70 to the hatching basket 90 in the second embodiment may be facilitated by the use of an optional egg tray support shown in FIG. 12 and generally designated by the reference numeral 400. The egg tray support 400 includes two transverse support rails 402, 404, configured to be mounted adjacent the ends of the transverse guide rails 136, 138, respectively. The free ends of the support rails 402, 404 are connected to a longitudinally directed handle member 406 that extends between and joins the free ends to form a tray changing platform, generally designated by the reference numeral 410. Preferably, the support rails 402, 404 are hingedly connected to the guide rails 136, 138 so that, when the machine is not in use, the handle member 406 with platform 410 may be rotated upwardly on the hinges 401 from the down position shown to a folded position (not shown) for easier access to and/or moving of the machine.

Suspended from the support rails 402, 404 and spaced therefrom by vertical connecting members 412, 413 is an egg tray pan holder generally designated by the reference numeral 414. The pan holder 414 includes a longitudinally extending base 416 and upwardly directed, longitudinally extending sides 418 to hold a pan 80 (see FIG. 5) with one or more egg trays thereon without allowing the pan 80 to slide off transversely. The front 420 and back 422 of the base are preferably open to facilitate sliding placement of the pan thereon from either end.

Egg tray transfer and loading can be performed by two operators using the egg tray support 400. To start, a first pan with egg trays having eggs to be injected is placed on the tray changing platform 410 and a second pan also loaded with eggs is placed on the pan holder 414. The first pan on the platform is transferred to the support cradle 160 and moved into the injection position where the eggs are injected. The first pan is then moved back to the loading/unloading position. A hatching tray 90 is turned upside down and lowered over the egg trays 70 in the first pan. As in the first embodiment, the spacer towers 74 serve to prevent the hatching tray 90, once fully lowered over the eggs trays, from crushing the eggs.

The two operators then support the bottom 88 of the pan 80 to keep the egg trays in abutment with the bottom 94 of the hatching basket 90 and the pan 80, egg trays 70 and hatching basket 90 are rotated to bring the hatching basket right side up after which the hatching basket is placed on the changing platform 410. A first of the two operators can then carry the hatching basket to an appropriate location while the second person moves the second pan from the pan holder to the support cradle 160 and then into the injection position. During the next injection sequence, the first person returns with an empty hatching tray while the second person loads a next third pan with eggs into the pan holder. When the second pan has been returned to the loading/unloading position, the above sequence as described upon return of the first pan to the loading/unloading position is repeated, and so on. The positioning of the egg tray support on the loading/unloading side of the frame thus provides a convenient and secure location for completing the incubating tray to hatching basket transfer while providing room for placement of the next pan of eggs to be injected, increasing the efficiency and productivity of the two operators.

As would be understood by persons of ordinary skill in the art, other mechanisms could also be constructed to provide the lateral movement of the pan and egg trays and these other constructions are intended to be included within the scope of the present invention. In addition, while it is preferred that the support cradle 60, 160 be moved by the operator by hand, it is also contemplated that the cradle 60, 160 be moved automatically, such as by one or more pneumatic cylinders.

As described herein, the present invention provides an in-ovo egg injection machine that brings state of the art automated vaccine dosage control and egg injection capability to smaller volume incubation operations. Using the transversely movable rail system, egg trays can be easily moved into and out of the injector assembly by hand, while the pan allows for safe handling and transfer of the eggs both before and after injection. The compact in-ovo egg injection machine can automatically inject up to three egg trays of eggs simultaneously while having a frame footprint not much larger than the injector matrix.

Due to its compact size and reduced automated operations, the in-ovo injection machine of the present invention provides an attractive alternative to the much larger and more complex machines currently on the market. The machine of this invention is especially attractive to smaller hatcheries which process fewer eggs, often with multiple type incubator trays, which desire automated egg injection at a lower cost. The compact size and arrangement of the loading and off-loading of the machines also reduces the floor space needed for its operation.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An automated injection machine for injecting fluid substances into eggs, said machine comprising:
   a support frame having a movable supporting structure mounted thereon, said movable supporting structure retaining an egg tray thereon and said movable supporting structure and said egg tray moving together laterally in a generally horizontal direction when said egg tray is retained on said support structure;
   an injector assembly mounted on or coupled to said support frame and having a plurality of injectors arranged in a generally rectangular, longitudinally extending matrix above said egg tray;
   said plurality of injectors being movable in a substantially vertical direction and having needles to inject eggs in said egg tray retained on and positioned by said supporting structure; and
   said supporting structure being movable between an injection position in which eggs in an egg tray retained on said supporting structure are positioned directly underneath and in vertical alignment with said injectors and a loading position in which said supporting structure and said egg tray retained thereon are positioned laterally away from said injectors, said supporting structure being movable back and forth between said injection and loading positions.

2. The automated egg injection machine as set forth in claim 1, wherein said supporting structure includes a pair of longitudinally extending opposed support rails rigidly mounted on a movable plate member so that the support rails are spaced from one another at a set distance to define a traveling support cradle.

3. The automated egg injection machine as set forth in claim 2, wherein said plate member is movably mounted on at least two pairs of wheels that roll on opposed transversely extending guide rails between said injection position and said loading position.

4. The automated egg injection machines as recited in claim 3, wherein the wheels of each pair are rigidly interconnected by a shaft.

5. The automated egg injection machines as recited in claim 4, wherein said wheels are coupled to toothed rollers that move along racks mounted on said guide rails.

6. The automated egg injection machine as set forth in claim 1, wherein said supporting structure is manually movable.

7. The automated egg injection machine as set forth in claim 1, further comprising a series of spray nozzles mounted on said frame and under the injectors to spray sanitizing solution upwardly onto said injectors and said needles during a sanitizing cycle.

8. The automated egg injection machine as recited in claim 1, wherein the injection section includes a moveable injector assembly in which said injectors are individually moveable within said injector assembly in a vertical direction, and further includes gripping elements in said injector assembly which inflate to grip said injectors when properly positioned on said eggs for injection.

9. The automated egg injection machines as recited in claim 1, further comprising an egg tray support mounted to said support frame on a side thereof adjacent the loading position.

10. An automated injection machine for injecting fluid substances into eggs, said machine comprising:
    an injector assembly having a plurality of injectors arranged in a matrix and coupled to a fluid delivery system;
    a machine frame including a manually movable supporting structure mounted thereon for holding and moving an egg tray through a horizontal range of motion with respect to said frame;
    said plurality of injectors being machine movable in a substantially vertical direction and having needles to inject eggs in an egg tray positioned on said supporting structure with a fluid provided by said fluid delivery system in accordance with an automated injection sequence; and
    said supporting structure being manually movable back and forth through said horizontal range of motion to move in one direction from an injection position in which eggs on an egg tray positioned on said supporting structure are underneath and in vertical alignment with said injectors, to a loading position in which said supporting structure is moved to one side with respect to said injection position, and then to move in an opposite direction to return to the infection position.

11. The automated egg injection machine as set forth in claim 10, wherein said injector assembly and said supporting structure are mounted on a frame having a longitudinal length and a lateral width, said supporting structure being movable only transversely to said length so as to move back and forth across said width.

12. The automated egg injection machine as set forth in claim 11, wherein said supporting structure includes a pair of longitudinally extending opposed support rails rigidly mounted on a movable plate member so that the support rails are spaced from one another at a set distance, said support rails and said plate member together defining a traveling support cradle for holding and moving an egg tray between said loading and injection positions.

13. The automated egg injection machine as set forth in claim 12, wherein said plate member is movably supported on two transversely extending guide rails having a length that is approximately twice a width of said injector assembly and that generally corresponds with said frame width so that said support cradle can be moved back and forth between said injection position and said loading position.

14. The automated egg injection machine as set forth in claim 12, wherein said plate member is mounted on wheels that roll on said transversely extending guide rails.

15. The automated egg injection machine as set forth in claim 11, further comprising a series of spray nozzles mounted on said frame and under the injectors to spray sanitizing solution upwardly onto said injectors and needles during a sanitizing cycle.

16. The automated egg injection machine as recited in claim 11, further comprising a longitudinal alignment mechanism and a lateral alignment mechanism to ensure the eggs are in vertical alignment with the injectors prior to injection.

17. The automated egg injection machine as recited in claim 16, wherein the longitudinal alignment mechanism includes a pair of tapered guide arms in spaced relationship adjacent front and rear ends of said frame, and said lateral alignment mechanism includes a placement bracket and a stop bracket between which the movable supporting structure is laterally positioned prior to injection.

18. The automated egg injection machine as recited in claim 10, wherein the injection section includes a moveable injector assembly in which said injectors are individually moveable within said injector assembly in a vertical direction, and further includes gripping elements in said injector assembly which inflate to grip said injectors when properly positioned on said eggs for injection.

19. A method of injecting eggs with a fluid using an automated injection assembly including a plurality of injectors arranged in a matrix and supported on a frame and a manually movable supporting structure also mounted on said frame and arranged to move horizontally back and forth from an injection position directly under the injection assembly to a loading position that is horizontally spaced from said injection position, the method comprising the steps of:
  manually moving the supporting structure horizontally in a first direction to the loading position;
  arranging at least one tray of eggs onto the supporting structure in said loading position;
  manually moving the supporting structure horizontally in a second direction to the injection position, said second direction being opposite said first direction;
  activating the automated injection assembly to inject the eggs on the egg tray with a fluid in said injection position; and
  manually moving the supporting structure horizontally back to the loading position where the egg tray can be removed and a new egg tray loaded for a next automated injection sequence.

20. The method as set forth in claim 19, wherein said steps of manually moving include rolling said supporting structure laterally on spaced guide rails mounted to said frame.

21. The method as set forth in claim 19, further comprising the step of spraying sanitizing solution onto the injectors during a sanitizing cycle.

22. The method as set forth in claim 21, wherein said sanitizing solution is sprayed upwardly from a series of spray nozzles mounted on the frame under the injectors.

23. The method as set forth in claim 19, further comprising the step of using an alignment mechanism to bring the eggs into vertical alignment with the injectors in the injection position prior to injecting the eggs.

24. The method as set forth in claim 23, wherein said injection assembly includes a plurality of gripping elements and said injectors are individually movable within said assembly, said method further comprising the step of inflating said gripping elements in said assembly to grip said injectors when said injectors are vertically aligned with said eggs for injection.

* * * * *